(12) United States Patent
Oh et al.

(10) Patent No.: US 12,549,991 B2
(45) Date of Patent: Feb. 10, 2026

(54) ELECTRONIC DEVICE FOR TRANSMITTING MEASUREMENT REPORT AND OPERATION METHOD OF ELECTRONIC DEVICE

(71) Applicant: Samsung Electronics Co., Ltd., Suwon-si (KR)

(72) Inventors: Hyeongjoo Oh, Suwon-si (KR); Kyoungwoon Kim, Suwon-si (KR); Jaewoo Park, Suwon-si (KR); Sungsoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 18/355,622

(22) Filed: Jul. 20, 2023

(65) Prior Publication Data

US 2024/0031854 A1 Jan. 25, 2024

Related U.S. Application Data

(63) Continuation of application No. PCT/KR2023/009414, filed on Jul. 4, 2023.

(30) Foreign Application Priority Data

Jul. 20, 2022 (KR) .................. 10-2022-0089854
Aug. 8, 2022 (KR) .................. 10-2022-0098697

(51) Int. Cl.
*H04W 24/10* (2009.01)
*H04W 24/08* (2009.01)
(52) U.S. Cl.
CPC ........... *H04W 24/10* (2013.01); *H04W 24/08* (2013.01)

(58) Field of Classification Search
CPC .............................. H04W 24/10; H04W 24/08
See application file for complete search history.

(56) References Cited

U.S. PATENT DOCUMENTS 7,636,583 B2   12/2009   Ode et al.
8,526,980 B2    9/2013   Ebata
(Continued)

FOREIGN PATENT DOCUMENTS

EP         2800412 A1    11/2014
JP    2006-352385 A     12/2006
(Continued)

OTHER PUBLICATIONS

PCT International Search Report dated Oct. 13, 2023 for PCT/KR2023/009414.
(Continued)

*Primary Examiner* — Joseph E Avellino
*Assistant Examiner* — Maryam Emadi
(74) *Attorney, Agent, or Firm* — Nixon & Vanderhye P.C.

(57) ABSTRACT

An electronic device may include: a first antenna configured to transmit a signal or receive a signal; a second antenna configured to receive the signal; a communication circuit connected to the first antenna and the second antenna, and configured to receive data from or transmit data to a network via a first node; and a communication processor, wherein the communication processor may receive a measurement object including information related to a second node adjacent to the first node from the network. The communication processor may identify a first quality of the signal received through the first antenna and a second quality of the signal received through the second antenna. The communication processor may identify whether the first quality satisfies a report condition included in the measurement object, based on that the electronic device satisfies a designated condition.

(Continued)

The communication processor may be configured to transmit a measurement report including the first quality to the network, based on that the first quality satisfies the report condition.

20 Claims, 11 Drawing Sheets

(56) References Cited

U.S. PATENT DOCUMENTS

| | | | |
|---|---|---|---|
| 9,560,560 | B2 | 1/2017 | You et al. |
| 10,827,398 | B2 | 11/2020 | Park et al. |
| 11,019,547 | B1 | 5/2021 | Oroskar et al. |
| 2010/0272018 | A1 | 10/2010 | Furueda et al. |
| 2015/0065188 | A1 | 3/2015 | Nukala et al. |
| 2019/0208448 | A1 | 7/2019 | Peng et al. |
| 2020/0280360 | A1 | 9/2020 | Bai et al. |
| 2020/0314704 | A1* | 10/2020 | Abdel Shahid ....... H04W 76/27 |
| 2021/0105680 | A1 | 4/2021 | Nilsson |
| 2021/0144807 | A1* | 5/2021 | Bae .................. H04W 36/0069 |
| 2022/0159540 | A1 | 5/2022 | Park et al. |
| 2024/0008031 | A1 | 1/2024 | Rom et al. |

FOREIGN PATENT DOCUMENTS

| | | | | |
|---|---|---|---|---|
| JP | 2011130355 A | | 6/2011 | |
| JP | 2018-056687 A | | 4/2018 | |
| KR | 10-1576736 B1 | | 12/2015 | |
| KR | 2017-0084625 A | | 7/2017 | |
| KR | 20210051835 A | * | 5/2021 | ............ H04W 88/06 |
| KR | 10-2492305 B1 | | 1/2023 | |
| WO | 2013121396 A1 | | 8/2013 | |
| WO | WO2020-218759 A1 | | 10/2020 | |
| WO | WO2022-069341 A1 | | 4/2022 | |
| WO | WO2024-019368 A1 | | 1/2024 | |

OTHER PUBLICATIONS

PCT Notice of Publication dated Jan. 25, 2024 for PCT/KR2023/009414.

* cited by examiner

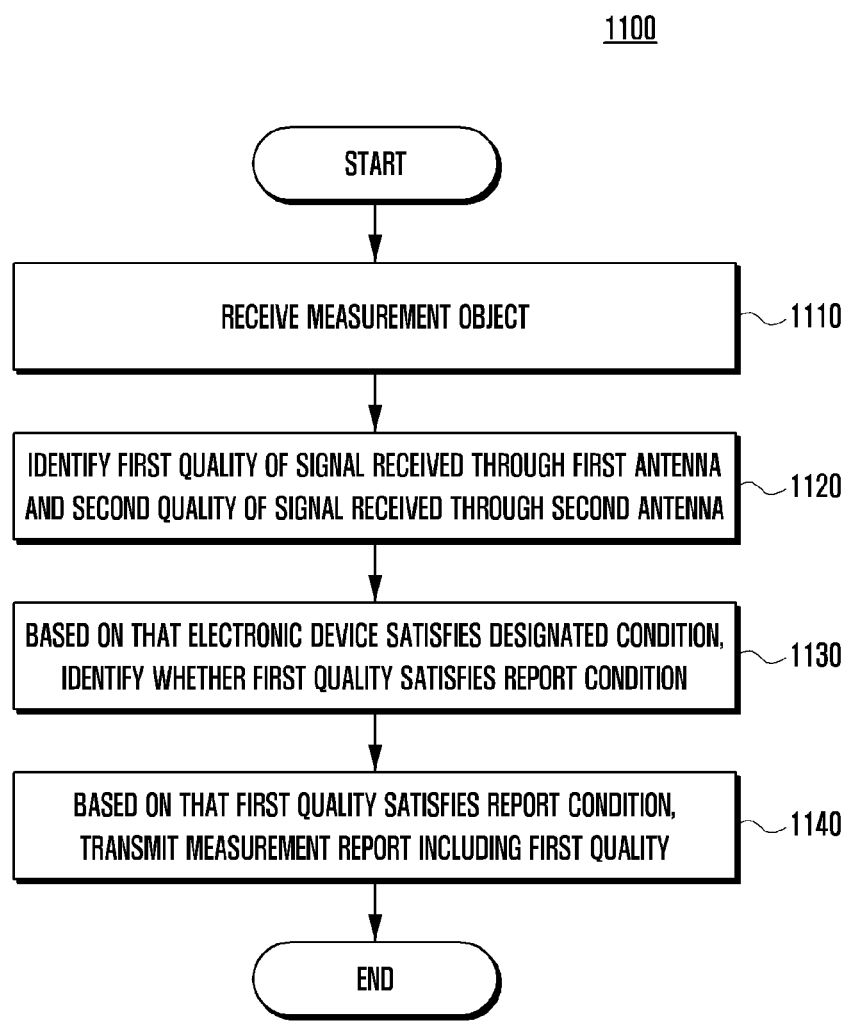

ELECTRONIC DEVICE FOR TRANSMITTING MEASUREMENT REPORT AND OPERATION METHOD OF ELECTRONIC DEVICE

CROSS-REFERENCE TO RELATED APPLICATIONS

This application is a continuation of International Application No. PCT/KR2023/009414 filed on Jul. 4, 2023, designating the United States, in the Korean Intellectual Property Receiving Office, and claiming priority to KR Patent Application No. 10-2022-0089854 filed on Jul. 20, 2022, and KR Patent Application No. 10-2022-0098697 filed on Aug. 8, 2022, in the Korean Intellectual Property Office, the disclosures of all of which are hereby incorporated by reference herein in their entireties.

BACKGROUND

Field

An example embodiment relates to an electronic device and an operation of the electronic device and, for example, to an electronic device for transmitting a measurement report and/or an operation method of the electronic device.

Description of Related Art

To meet the growing demand for wireless data traffic after commercialization of 4G communication systems, efforts have been made to develop an improved 5G or pre-5G communication system. For this reason, the 5G or pre-5G communication system is called a beyond 4G network communication system or a post-LTE system. In order to achieve a high data rate, implementation of the 5G communication system in the ultra-high frequency (mmWave) band (e.g., band equal to or higher than 6 GHz) is being considered in addition to a band (band equal to or lower than 6 GHz) used by LTE. In the 5G communication system, technologies, such as beamforming, massive multi-input multi-output (MIMO), full dimensional MIMO (FD-MIMO), array antenna, analog beamforming, and large-scale antenna, are being discussed.

An electronic device may be connected to a network via a node, transmit data to an external electronic device via cellular communication, or receive data transmitted by the external electronic device. The electronic device may perform handover to change a connected node in various situations. In a situation where the quality of a signal transmitted by a currently connected node and the quality of signals transmitted by nodes adjacent to the connected node satisfy a reporting condition, the electronic device may transmit a measurement report including the quality of signals transmitted by the adjacent nodes to the connected node. The connected node may receive the measurement report, transmit a handover command to the electronic device, and transmit a handover request message to the adjacent nodes. The electronic device having received the handover command and the adjacent nodes having received the handover request message may perform a handover procedure. Handover in an appropriate situation may help maintain connectivity between the electronic device and a cellular network.

The electronic device may include multiple antennas. The electronic device may include an antenna (e.g., a TRx antenna) for signal transmission or reception and an antenna for diversity reception. The electronic device may identify whether the best quality among qualities of signals received through the multiple antennas satisfies a report condition.

However, imbalance in performance between the multiple antennas may occur due to various causes. For example, the performance of the antenna performing signal transmission or reception may decrease compared to the performance of the antenna performing diversity reception. When the performance of the antenna performing signal transmission or reception decreases, a communication quality related to signal transmission may deteriorate. The electronic device may determine whether to transmit a measurement report, based on a quality of a signal received by the antenna performing diversity reception, and if the electronic device determines not to transmit the measurement report, even though quality degradation related to signal transmission occurs, the electronic device may not be able to perform handover. If proper handover does not occur, communication quality of the electronic device may deteriorate and a radio link failure (RLF) may occur.

SUMMARY

An electronic device according to an example embodiment may include: a first antenna configured to transmit a signal or receive a signal; a second antenna configured to receive the signal; a communication circuit connected, directly or indirectly, to the first antenna and the second antenna, and configured to receive data from or transmit data to a network via a first node; and a communication processor, wherein the communication processor may receive a measurement object including information related to a second node adjacent to the first node from the network. The communication processor may identify a first quality of the signal received through the first antenna and a second quality of the signal received through the second antenna. The communication processor may identify whether the first quality satisfies a report condition included in the measurement object, based on that the electronic device satisfies a designated condition. The communication processor may be configured to transmit a measurement report including the first quality to the network, based on that the first quality satisfies the report condition.

An operation method of an electronic device according to an example embodiment may include receiving a measurement object including information related to a second node adjacent to a first node connected, directly or indirectly, to the electronic device from a network. The operation method of the electronic device may include identifying a first quality of a signal received through a first antenna and a second quality of a signal received through a second antenna. The operation method of the electronic device may include identifying whether the first quality satisfies a report condition included in the measurement object, based on that the electronic device satisfies a designated condition. The operation method of the electronic device may include transmitting a measurement report including the first quality to the network, based on that the first quality satisfies the report condition.

An electronic device according to an example embodiment may include: a first antenna configured to transmit a signal; a second antenna configured to receive a signal; a communication circuit connected, directly or indirectly, to the first antenna and the second antenna, and configured to receive data from or transmit data to a network via a first node; and a communication processor comprising processing circuitry. The communication processor may receive a measurement object including information related to a second node adjacent to the first node from the network. The communication processor may identify a first quality of the signal received through the first antenna and a second quality of the signal received through the second antenna. The communication processor may calibrate at least one quality among the first quality and the second quality, based on that the electronic device satisfies a designated condition. The communication processor may identify whether the calibrated quality satisfies a report condition included in the measurement object. The communication processor may be configured to transmit a measurement report including the calibrated quality to the network, based on that the calibrated quality satisfies the report condition.

An electronic device according to an example embodiment may include: a first antenna configured to transmit a signal or receive a signal; a second antenna configured to receive a signal; a communication circuit connected, directly or indirectly, to the first antenna and the second antenna, and configured to receive data from or transmit data to a network via a first node; and a communication processor. The communication processor may receive a measurement object including information related to a second node adjacent to the first node from the network. The communication processor may identify a first quality of the signal received through the first antenna and a second quality of the signal received through the second antenna. The communication processor may identify whether one quality among the first quality and the second quality satisfies a report condition included in the measurement object, based on that the electronic device satisfies a designated condition. The communication processor may be configured to transmit a measurement report including the calibrated quality to the network, based on that the one quality satisfies the report condition.

BRIEF DESCRIPTION OF DRAWINGS

The above and other aspects, features and advantages of certain embodiments of the present disclosure will be more apparent from the following detailed description, taken in conjunction with the accompanying drawings, in which:

FIG. 11 is an operation flowchart illustrating an operation method of an electronic device according to an example embodiment.

DETAILED DESCRIPTION

Figure 1:
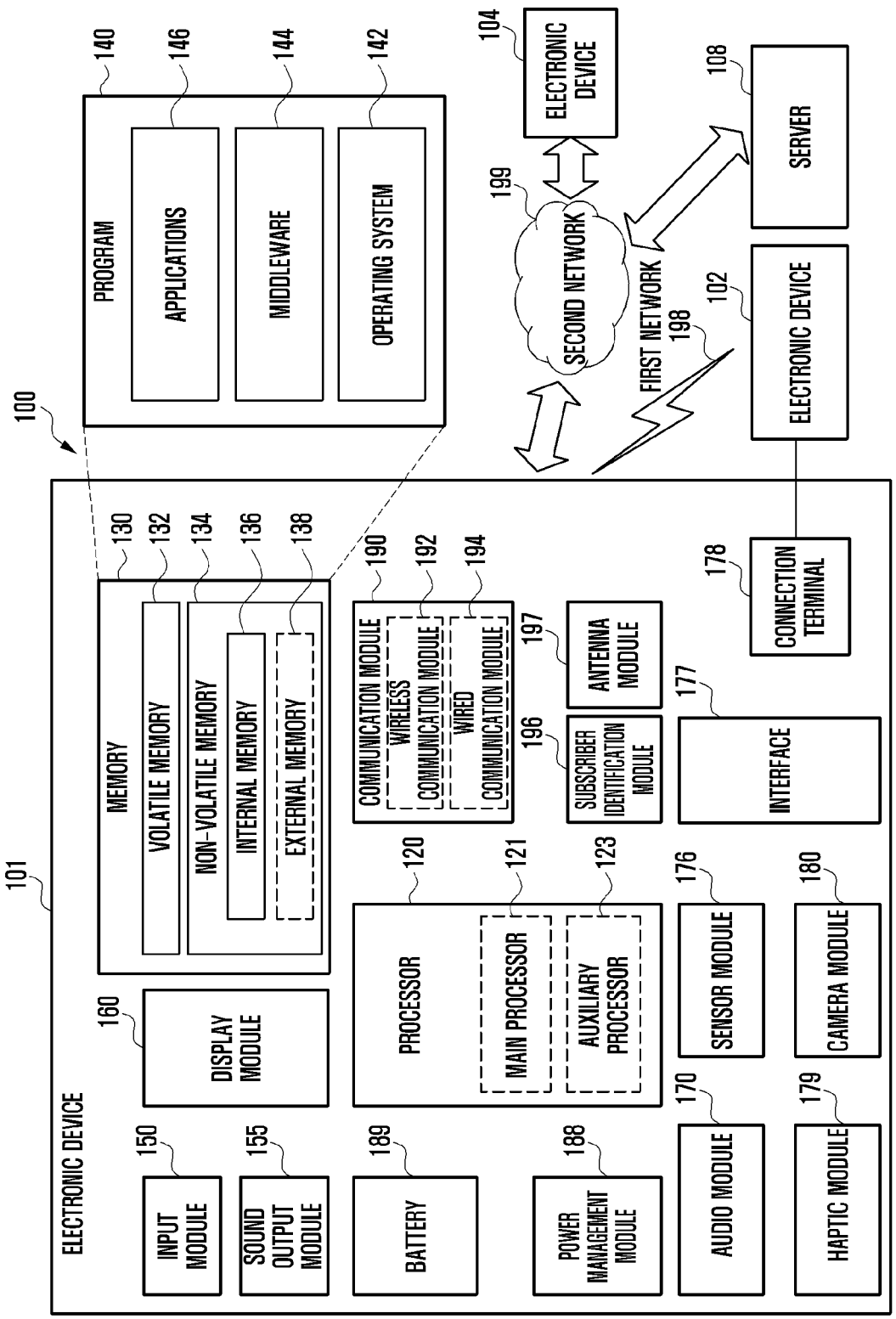
FIG. 1 is a block diagram of an electronic device according to an example embodiment.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device/module 160 comprising a display, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134 (e.g., internal memory 136 and/or external memory 138). According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting/connection terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
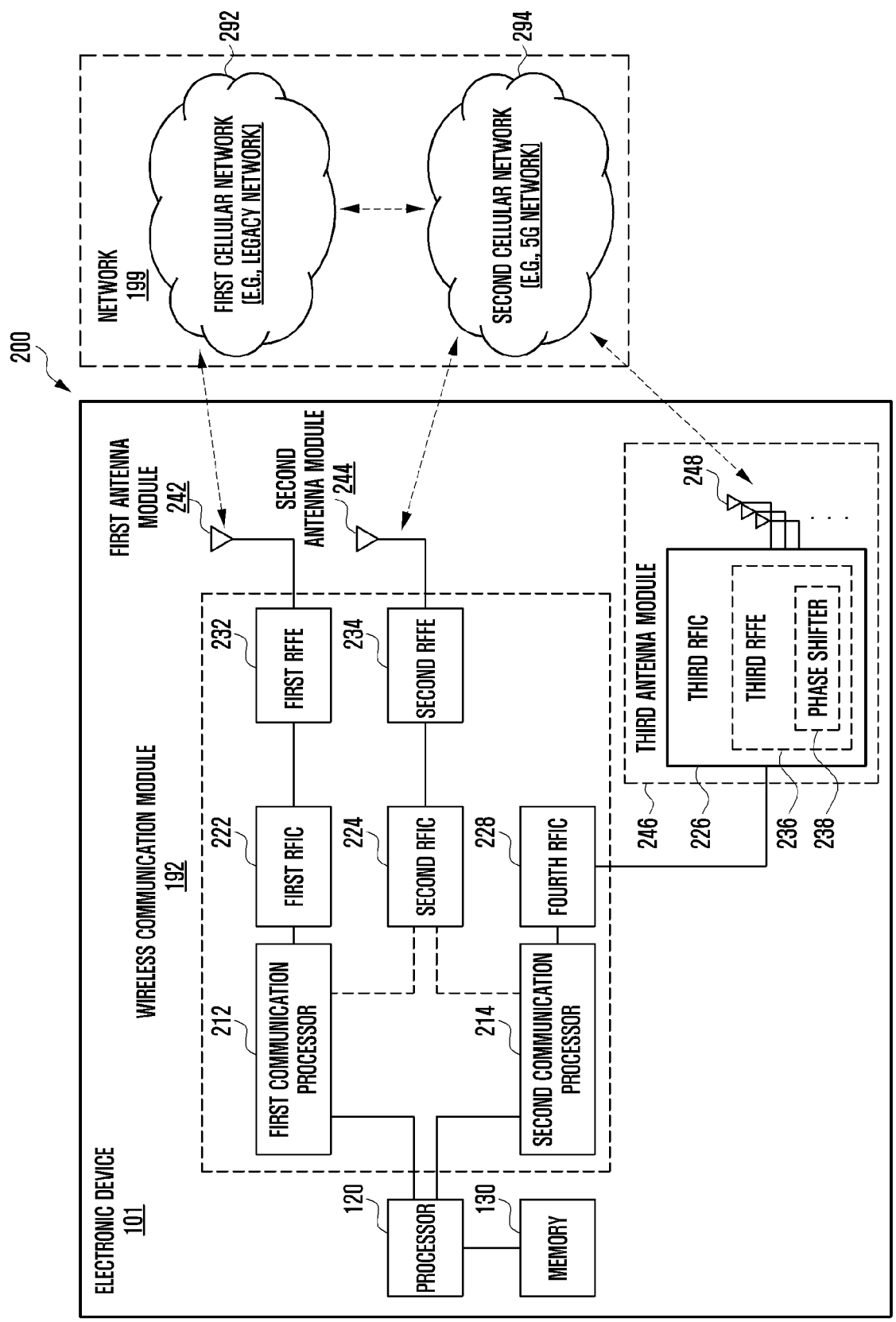
FIG. 2 is a block diagram of an electronic device that supports legacy network communication and 5G network communication according to an example embodiment.

FIG. 2 is a block diagram 200 of an electronic device 101 for supporting legacy network communication and 5G network communication according to certain embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first cellular network 292 and a second cellular network 294. According to another embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be included as at least a part of the wireless communication module 192. According to another embodiment, the fourth RFIC 228 may be omitted or may be included as a part of the third RFIC 226.

The first communication processor 212 may establish a communication channel of a band to be used for wireless communication with the first network 292, and may support legacy network communication via the established communication channel. According to certain embodiments, the first network may be a legacy network including 2G, 3G, 4G, or long term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established channel According to certain embodiments, the second network 294 may be a 5G network defined in 3GPP. Additionally, according to an embodiment, the first communication processor 212 or the second communication processor 214 may establish a communication channel corresponding to another designated band (e.g., lower than 6 GHz) among bands to be used for wireless communication with the second network 294, and may support 5G network communication via the established channel. According to an embodiment, the first communication processor 212 and the second communication processor 214 may be implemented in a single chip or a single package. According to certain embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHz) used for the second network 294 (e.g., 5G network). In the case of reception, a 5G Sub6 RF signal is obtained from the second network 294 (e.g., a 5G network) via an antenna (e.g., the second antenna module 244), and may preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second network 294 (e.g., 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal to a baseband signal so that the base band signal is processed by the second communication processor 214. According to an embodiment, the third RFFE, 236 may be implemented as a part of the third RFIC 226.

According to an embodiment, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFIC 226. The fourth RFIC 228 may convert the IF signal to a baseband signal so that the base band signal is processed by the second communication processor 214.

According to an embodiment, the first RFIC 222 and the second RFIC 224 may be implemented as a single chip or at least a part of the single package. According to an embodiment, the first RFFE, 232 and the second RFFE 234 may be implemented as a single chip or at least a part of the single package. According to an embodiment, at least one antenna module of the first antenna module 242 or the second antenna module 244 may be omitted, or may be combined with another antenna module so as to process RF signals in a plurality of bands.

According to an embodiment, the third RFIC 226 and the antenna 248 may be disposed in the same substrate, and may form the third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second network 294 (e.g., 5G network).

According to an embodiment, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second network 294 (e.g., 5G network) may operate independently (e.g., Stand-Along (SA)) from the first network 292 (e.g., a legacy network), or may operate by being connected thereto (e.g., Non-Stand Alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by another component (e.g., the processor 120, the first communication processor 212, or the second communication processor 214).

Figure 3:
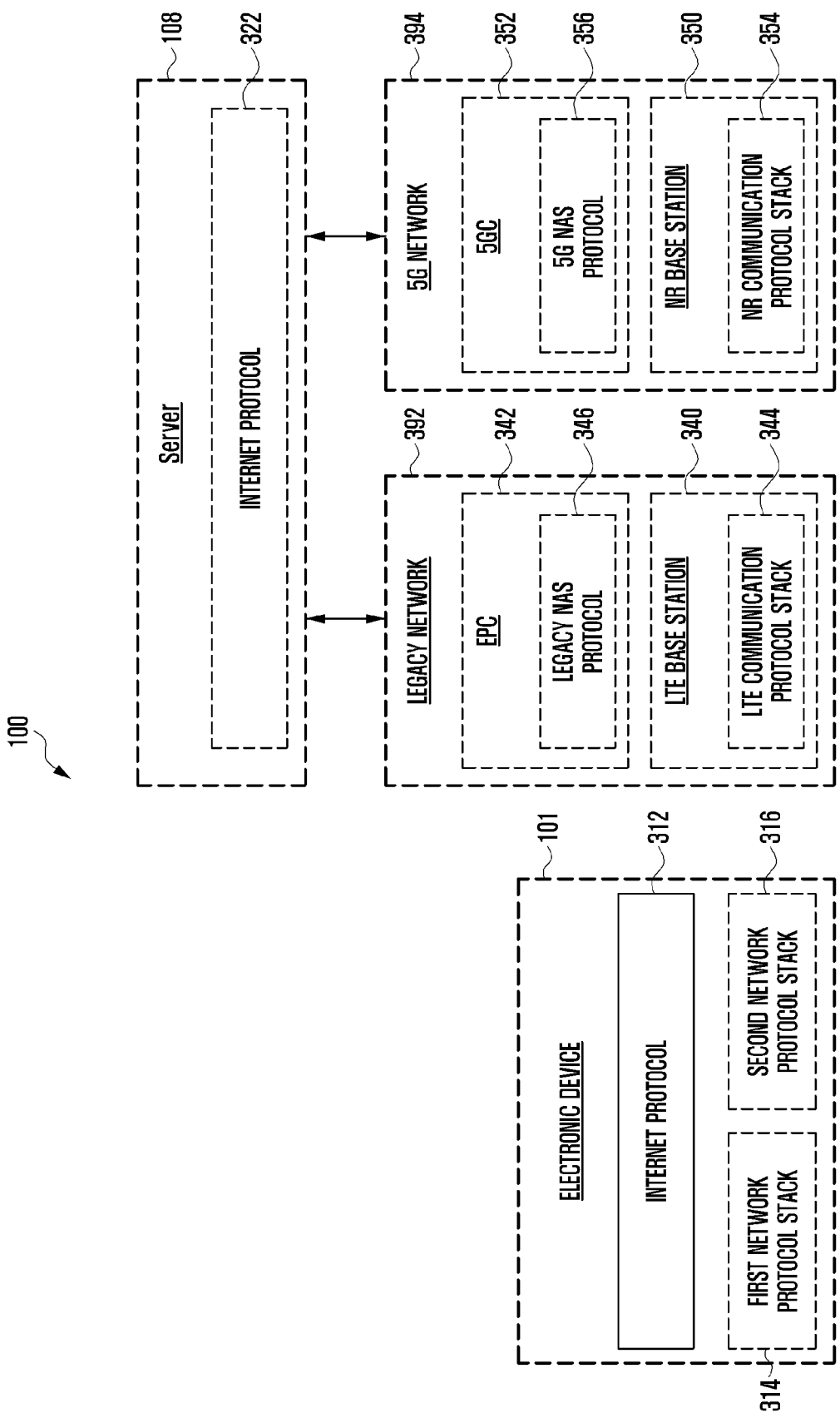
FIG. 3 is a diagram illustrating a protocol stack structure of a network 100 for legacy communication and/or 5G communication according to an example embodiment.

FIG. 3 illustrates a protocol stack structure of the network 100 of legacy communication and/or 5G communication according to an embodiment.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform Interne communication associated with the server 108 through the Internet protocol 312 (for example, a TCP, a UDP, or an IP). The Internet protocol 312 may be executed by, for example, a main processor (for example, the main processor 121 of FIG. 1) included in the electronic device 101.

According to another embodiment, the electronic device 101 may perform wireless communication with the legacy network 392 through the first communication protocol stack 314. According to another embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to another embodiment, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARQ) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4:
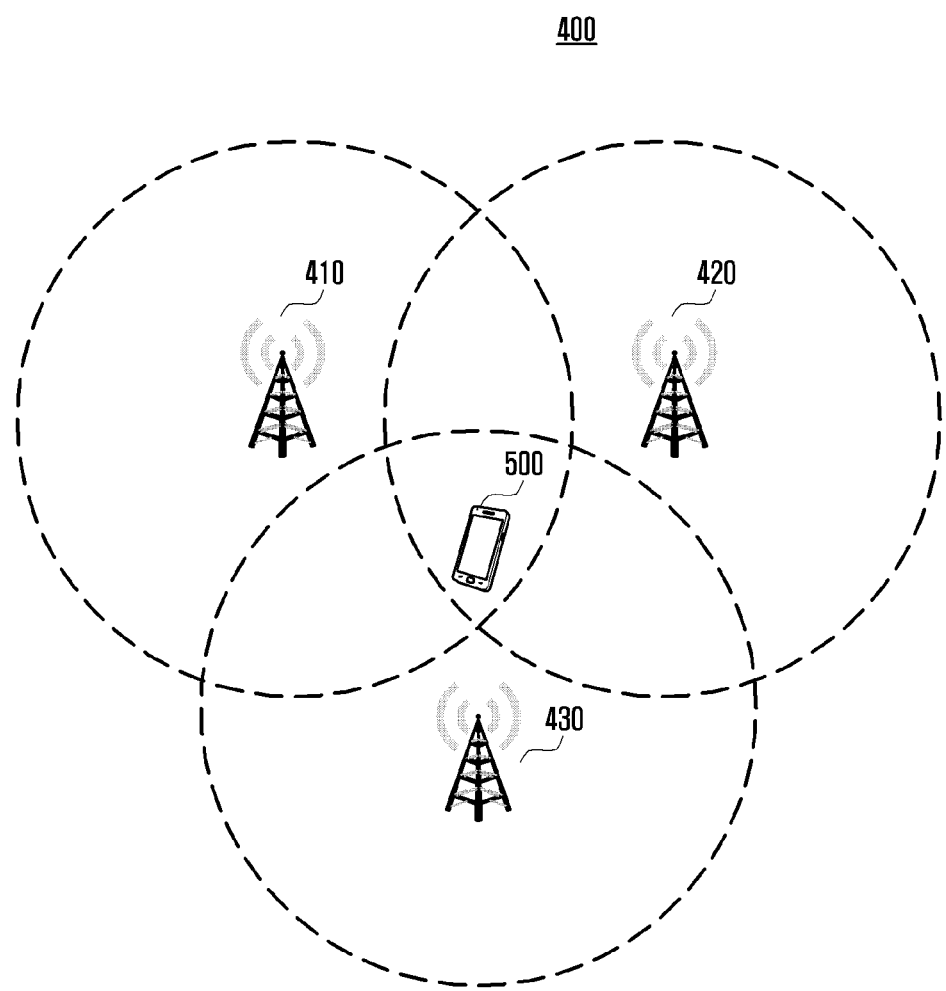
FIG. 4 is a diagram illustrating an electronic device and a cellular network according to an example embodiment.

FIG. 4 is a diagram illustrating an electronic device and a cellular network according to an example embodiment.

According to an example embodiment, a cellular network 400 may include a first node (e.g., the LTE base station 340 or the NR base station 350 of FIG. 3) 410, a second node (e.g., the LTE base station 340 or the NR base station 350 of FIG. 3) 420, and/or a third node (e.g., the LTE base station 340 or the NR base station 350 of FIG. 3) 430. Each of the nodes 410, 420, and/or 430 may be of, or include, a base station and/or a cell of a cellular network in certain example embodiments.

According to an example embodiment, the first node 410 may be a base station supporting first cellular communication. The first cellular communication is one communication scheme of various cellular communication schemes supportable by an electronic device 500, and may refer to, for example, a communication scheme on the second cellular network 294 of FIG. 2. For example, the first cellular communication may be one of 5G mobile communication schemes (e.g., a communication scheme using FR1 which is a band of 6 GHz or lower, and a communication scheme using FR2 which is a frequency band of 6 GHz or higher). According to an embodiment, the first node 410 may be a node that outputs a signal of a first frequency band (e.g., a frequency band of 6 GHz or higher).

According to an example embodiment, a second node 420 may be a base station supporting the first cellular communication. According to an embodiment, the second node 420 may be a node that outputs a signal of a second frequency band (e.g., a frequency band of 6 GHz or higher) different from the first frequency band.

According to an example embodiment, a third node 430 may be a base station supporting the first cellular communication. According to an embodiment, the third node 430 may be a node that outputs a signal of a third frequency band (e.g., a frequency band of 6 GHz or higher) different from the first frequency band and/or the second frequency band.

The electronic device 500 may be connected, directly or indirectly, to a node for various reasons. According to an embodiment, when connected to the first node 410, the electronic device 500 may be connected to the second node and/or the third node 430 according to movement of the electronic device 500. According to an embodiment, when connected to none of the first node 410, the second node 420, and/or the third node 430, the electronic device 500 may be connected to any one node.

For connection to a node, the electronic device 500 may search for a connectable node, measure a quality of a signal transmitted by the searched node, and report a measurement result to a core network (e.g., the EPC 342 and/or the 5GC 352 of FIG. 3) via a connected node or a node to be connected. For example, the core network 352 may select a node to which the electronic device 500 is to be connected, and transmit, to the electronic device 500, a message indicating connection to the selected node. The electronic device 500 and the node to be connected may perform operation for connection therebetween on the basis of reception of the message.

The electronic device 500 may receive information for a node search from the connected node. According to an embodiment, the electronic device 500 may receive an RRC reconfiguration message. The RRC reconfiguration message may include information on a measurement object (measObject) and/or information on a report condition (report object) of a measurement result, which are related to at least one node connectable to the electronic device 500. The measurement object is information required for the electronic device 500 to perform measurement, and may include at least one of frequency band information (e.g., channel information) for performing node search and quality measurement of a searched node, and/or identification information (e.g., a physical cell ID) of a node outputting a signal of a frequency band included in the frequency band information. The report condition is a condition for reporting a measured quality, and may include identification information of an event (e.g., B1 event and B2 event) related to quality measurement, a designated value (threshold) related to a quality of a signal transmitted by the node, and/or a time (time to trigger (TTT)) during which satisfaction of the quality-related condition is maintained.

The electronic device 500 may receive the RRC reconfiguration message from a connected node, and identify a measurement object. According to an embodiment, the electronic device 500 may identify a measurement object having frequency band information of the first frequency band, and search for a node corresponding to the measurement object.

The electronic device 500 may search for at least one node and measure a quality of the searched node. The electronic device 500 may measure a quality (e.g., a reference signal received power (RSRP) or a reference signal received quality (RSRQ)) of a signal transmitted by the searched node, and identify whether a measurement result satisfies an event related to a quality report. The electronic device 500 may transmit a report message including the measurement result to a connected node, based on identification that the event is satisfied. As a quality measurement result, the report message may include at least one of identification information (e.g., a physical cell ID) of the measured node and/or identification information of information (e.g., synchronization signal block (SSB)) included in the signal transmitted by the measured node.

The electronic device 500 may include multiple antennas. According to an embodiment, the electronic device 500 may include a first antenna (e.g., a primary TRx (PTRx)) for transmitting or receiving a signal and a second antenna (e.g., a diversity Rx (DRx)) for diversity reception. The electronic device 500 may identify whether the event is satisfied, by using a higher quality among a first quality of a signal received through the first antenna and a second quality of a first signal received through a second the antenna. For example, if the first quality has a higher value than the second quality, the electronic device 500 may identify whether the first quality satisfies the event, and transmit, if the event is satisfied, a measurement result including the first quality to the cellular network 400. The cellular network 400 may receive the measurement result, and determine whether the electronic device 500 performs handover.

For example, if a signal quality of an adjacent node is higher than a signal quality of a connected node by a designated value (e.g., −6 dBm) or greater, the electronic device 500 may receive, from the cellular network 400, a measurement object including event A3 for transmission of a measurement report. When connected to the first node 410, the electronic device 500 may measure a quality of a signal transmitted by the first node 410 and a quality of a signal transmitted by the second node 420 adjacent to the first node 410, as described in Table 1 below.

TABLE 1

|  | A signal quality of the first node 410 measured by the first antenna | A signal quality of the first node 410 measured by the second antenna | A signal quality of the second node 420 measured by the first antenna | A signal quality of the second node measured by the second antenna |
|---|---|---|---|---|
| Normal state | −77 dBm | −78 dBm | −71 dBm | −73 dBm |

Among the signal quality (−77 dBm) of the first node measured by the first antenna and a signal quality (−78 dBm) of the first node 410 measured by the second antenna, the electronic device 500 may determine, as the signal quality of the first node 410, the signal quality of the first node 410 measured by the first antenna, which is the better quality.

Among the signal quality (−71 dBm) of the second node measured by the first antenna and a signal quality (−73 dBm) of the second node 420 measured by the second antenna, the electronic device 500 may determine, as the signal quality of the second node 420, the signal quality of the second node 420 measured by the first antenna, which is the better quality.

The electronic device 500 may compare the signal quality (−77 dBm) of the first node 410 with the signal quality (−71 dBm) of the second node 420, and transmit a measurement report including the signal quality (−71 dBm) of the second node 420 to the cellular network 400, based on identification that the signal quality (−71 dBm) of the second node 420 is higher than the signal quality (−77 dBm) of the first node 410 by a designated value or greater (or based on identification that event A3 is satisfied).

In the electronic device 500, performance of at least one of the first antenna and the second antenna may change for various reasons. If the performance of at least one of the first antenna and the second antenna changes, imbalance in the performance between the first antenna and the performance of the second antenna may occur.

For example, at least a part of the first antenna may be implemented on a housing of the electronic device 500. When an external electronic device (e.g., a charger or an earphone) is connected via a port (e.g., a universal series bus (USB)) of the electronic device 500, the performance of the first antenna may be degraded due to the external electronic device.

For another example, the housing of the electronic device 500 may be implemented as a foldable housing, and the first antenna and the second antenna may be implemented as parts of the housing. If a state of the housing of the electronic device 500 changes (e.g., changes from an unfolded state to a folded state), a distance between the first antenna and the second antenna may be reduced, and isolation for ensuring the performance of the first antenna and the second antenna may be reduced, so that the performance of the first antenna and the second antenna may be degraded.

For example, the first antenna and/or the second antenna may be implemented via the housing of the electronic device 500. When an external object contacts or approaches a part of the housing of the electronic device 500, where the first antenna is implemented, the performance of the first antenna may be degraded due to the external object.

When imbalance in the performance between the first antenna and the second antenna of the electronic device 500 occurs or increases, a quality of cellular communication performed by the electronic device 500 may decrease. According to an example, when imbalance in the performance between the first antenna and the second antenna occurs, unlike a situation in which imbalance does not occur, the electronic device 500 may not properly perform handover.

For example, if a signal quality of an adjacent node is higher than a signal quality of a connected node by a designated value (e.g., −6 dBm) or greater, the electronic device 500 may receive, from the cellular network 400, a measurement object including event A3 for transmission of a measurement report. When connected to the first node 410, the electronic device 500 may measure a quality of a signal transmitted by the first node 410 and a quality of a signal transmitted by the second node 420 adjacent to the first node 410, as described in Table 2 below.

TABLE 2

| A signal quality of the first node 410 measured by the first antenna | A signal quality of the first node 410 measured by the second antenna | A signal quality of the second node 420 measured by the first antenna | A signal quality of the second node 420 measured by the second antenna |
|---|---|---|---|
| −82 dBm | −78 dBm | −76 dBm | −73 dBm |

Referring to Tables 1 and 2, it may be identified that a signal quality (−82 dBm) of the first node 410 measured by the first antenna is lower than the signal quality (−77 dBm) before occurrence of the imbalance in the performance between the first and second antennas. It may be identified that a signal quality (−76 dBm) of the second node 420 measured by the first antenna is lower than the signal quality (−71 dBm) before occurrence of the imbalance in the performance between the first and second antennas.

Among the signal quality (−82 dBm) of the first node measured by the first antenna and the signal quality (−78 dBm) of the first node 410 measured by the second antenna, the electronic device 500 may determine, as the signal quality of the first node 410, the signal quality of the first node 410 measured by the second antenna, which is the better quality.

Among the signal quality (−76 dBm) of the second node measured by the first antenna and the signal quality (−73 dBm) of the second node 420 measured by the second antenna, the electronic device 500 may determine, as the signal quality of the second node 420, the signal quality of the second node 420 measured by the second antenna, which is the better quality.

The electronic device 500 may compare the signal quality (−78 dBm) of the first node 410 with the signal quality (−73 dBm) of the second node 420, and may not transmit a measurement report including the signal quality (−73 dBm) of the second node 420 to the cellular network 400, based on identification that the signal quality (−73 dBm) of the second node 420 is not higher than the signal quality (−78 dBm) of the first node 410 by a designated value or greater (or based on identification that event A3 is not satisfied).

Although the electronic device 500 needs to perform handover from the first node 410 to the second node 420 in order to exhibit proper communication performance, there may occur a situation in which handover to the second node 420 is not possible due to imbalance in the performance between the first antenna and the second antenna. A handover failure may cause a decrease in cellular communication performance of the electronic device 500 and/or a radio link failure (RLF) between the electronic device 500 and the cellular network 400.

Hereinafter, descriptions will be provided for an embodiment in which the electronic device 500 may perform appropriate handover in consideration of imbalance in the performance between the first antenna and the second antenna.

Figure 5:
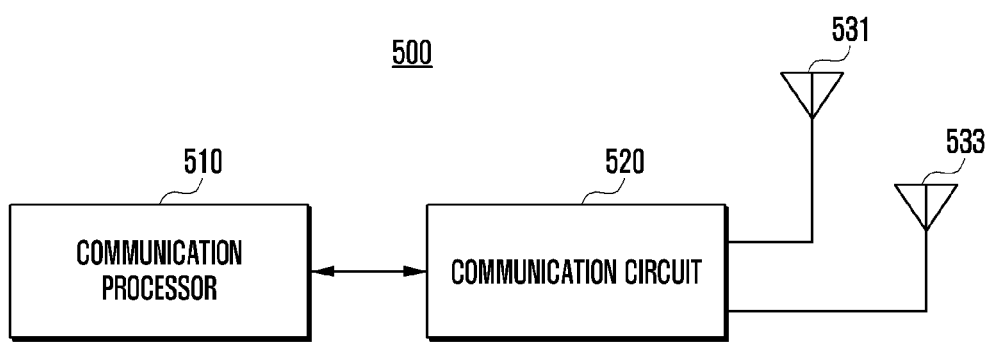
FIG. 5 is a diagram illustrating an electronic device according to an example embodiment.

FIG. 5 is a diagram illustrating an electronic device according to an example embodiment.

Referring to FIG. 5, the electronic device (e.g., the electronic device 101 of FIG. 1) 500 according to an example embodiment may include a processor (e.g., the processor 120 of FIG. 1, the first communication processor 212 of FIG. 2 and/or the second communication processor 214 of FIG. 2, each of which comprises processing circuitry) 510, a communication circuit (e.g., the wireless communication module 192 of FIG. 1, comprising communication circuitry) 520, a first antenna (e.g., the first antenna module 242 of FIG. 2 or the second antenna module 244 of FIG. 2, each comprising at least one antenna) 531, and/or a second antenna (e.g., the first antenna module 242 of FIG. 2 or the second antenna module 244 of FIG. 2, each comprising at least one antenna) 533.

The communication processor 510 may be operatively connected, directly or indirectly, to the communication circuit 520. The communication processor 510 may control elements of the electronic device 500.

The communication circuit 520 may provide communication with an external electronic device (e.g., the external electronic device 104 of FIG. 1) to the electronic device 500 via at least one network (e.g., the legacy network 392 or the 5G network 394 of FIG. 3). For example, the communication circuit 520 may support communication between the electronic device 500 and the external electronic device 104 via a first node (e.g., the first node 410 of FIG. 4), a second node (e.g., the second node 420 of FIG. 4), and/or a third node (e.g., the third node 430 of FIG. 4), based on control of the communication processor 510.

The first antenna 531 may be operatively connected, directly or indirectly, to the communication circuit 520 so as to transmit, to the outside, a signal transmitted by the communication circuit 510 or receive a signal transmitted from the outside, and transmit the received signal to the communication circuit 520. The first antenna 531 may be an antenna capable of transmitting or receiving a signal (e.g., a primary TRx (PTRx)).

The electronic device 500 may support diversity reception in order to increase a signal reception quality. The electronic device 500 may include the second antenna 533 (e.g., diversity Rx (DRx)) for diversity reception. The second antenna 533 may be operatively connected, directly or indirectly, to the communication circuit 520 so as to receive a signal transmitted from the outside and transmit the received signal to the communication circuit 520. However, the second antenna 533 is not limited to an antenna for diversity reception, and may be an antenna for transmitting or receiving a signal.

The communication processor 510 may control the communication circuit 520 to perform connection to a specific node (e.g., the first node 410) in order to perform cellular communication. The communication processor 510 may receive an RRC reconfiguration message from the first node 410 while connecting to the first node 410 or when connected to the first 410.

The RRC reconfiguration message may include information on a node (or a node adjacent to the first node 410) (e.g., the second node 420 and/or the third node 430) adjacent to the electronic device 500. Information on a node adjacent to the electronic device 500 may include information on a measurement object (measObject) and/or information on a report condition (report object), the information being related to the second node 420 and/or the third node 430 which are nodes adjacent to the electronic device 500 (or adjacent to the first node 410).

The measurement object is information required for the electronic device 500 to perform measurement, and may include frequency band information (e.g., channel information) for performing node search and quality measurement of a searched node, and/or identification information (e.g., a physical cell ID) of a node outputting a signal of a frequency band included in the frequency band information. The report condition is a condition for reporting a measured quality, and may include identification information of an event (e.g., event A3 that is a condition in which a signal strength of an adjacent node is greater than a signal strength of a connected node by a specific value or greater, and event A5 that is a condition in which a signal strength of a connected node is less than a designated magnitude, and a signal strength of an adjacent node is greater than the designated magnitude) related to a quality report, a designated value (threshold) related to a quality of a signal transmitted by the node, and/or a time (time to trigger (TTT)) during which satisfaction of the quality-related condition is maintained.

When connected to the first node 410, the communication processor 510 may measure a quality of a signal transmitted by the first node 410 and/or a quality of a signal transmitted by a node (e.g., the second node 420 and/or the third node 430) adjacent to the electronic device 500, which is included in the measurement object.

The communication processor 510 may receive signals transmitted (e.g., broadcast) by the first node 410 through the first antenna 531 and the second antenna 533, based on the identification information of the first node 410. The communication processor 510 may identify a first quality of the signal received through the first antenna 531 and a second quality of the signal received through the second antenna 533.

The communication processor 510 may identify whether the electronic device 500 satisfies a designated condition.

The designated condition may include a condition in which a difference between the first quality of the signal received through the first antenna 531 and the second quality of the signal received through the second antenna 533 is equal to or greater than (or exceeds) a designated value.

The designated condition may include a condition related to occurrence (or increase) of imbalance between performance of the first antenna 531 and performance of the second antenna 533.

In the electronic device 500, performance of at least one of the first antenna 531 and the second antenna 533 may change for various reasons. If the performance of at least one of the first antenna 531 and the second antenna 533 changes, imbalance between the performance of the first antenna 531 and the performance of the second antenna 533 may occur.

The designated condition may include a condition in which the electronic device 500 is connected, directly or indirectly, to an external electronic device via a port. For example, at least a part of the first antenna 531 may be implemented on the housing of the electronic device 500. When an external electronic device (e.g., a charger or an earphone) is connected via a port (e.g., a universal series bus (USB)) of the electronic device 500, the performance of the first antenna 533 may be degraded due to the external electronic device. When an application processor (e.g., the processor 120 of FIG. 1) receives a signal indicating that the electronic device 500 is connected to an external electronic device through a port, the communication processor 510 may determine that the electronic device 500 satisfies the designated condition. Alternatively, the application processor 120 may detect that the electronic device 500 is connected to an external device via a port, and transmit information indicating that the electronic device 500 satisfies the designated condition to the communication processor 510.

The communication processor 510 may determine that the designated condition is satisfied, based on reception of information indicating that the electronic device 500 satisfies the designated condition.

The designated condition may include a condition that a state of a form factor of the housing of the electronic device 500 is changed. The housing of the electronic device 500 may be implemented as a foldable housing, and the first antenna 531 and the second antenna 533 may be implemented as parts of the housing. If a state of the housing of the electronic device 500 changes (e.g., changes from an unfolded state to a folded state), a distance between the first antenna 531 and the second antenna 533 may become close, and isolation for ensuring the performance of the first antenna 531 and the second antenna 533 may be reduced, so that the performance of the performance of the first antenna 531 and the second antenna 533 may be degraded. When the application processor 120 receives a signal indicating that the state of the form factor of the electronic device 500 is changed, the communication processor 510 may determine that the electronic device 500 satisfies the designated condition. Alternatively, the application processor 120 may detect, via various sensors (e.g., a Hall sensor), that the state of the form factor of the electronic device 500 is changed, and transmit, to the communication processor 510, information indicating that the electronic device 500 satisfies the designated condition. The communication processor 510 may determine that the designated condition is satisfied, based on reception of information indicating that the electronic device 500 satisfies the designated condition.

The designated condition may include a condition of detecting that an external object contacts or approaches the electronic device 500. For example, the first antenna 531 and/or the second antenna 533 may be implemented via the housing of the electronic device 500. When an external object contacts or approaches a part of the housing of the electronic device 500, where the first antenna 531 is implemented, the performance of the first antenna 531 may be degraded due to the external object. When the application processor 120 receives a signal indicating that an external object contacts or approaches the electronic device 500 is received, the communication processor 510 may determine that the electronic device 500 satisfies the designated condition. Alternatively, the application processor 120 may detect, via various sensors (e.g., a proximity sensor), that an external object contacts or approaches the electronic device 500, and transmit, to the communication processor 510, information indicating that the electronic device 500 satisfies the designated condition. Based on reception of information indicating that the electronic device 500 satisfies the designated condition from the application processor 120, the communication processor 510 may determine that the designated condition is satisfied.

The designated condition described above may be a condition related to a physical event occurring on the electronic device 500. The designated condition may include various conditions that may affect the performance of the first antenna 531 and/or the second antenna 533.

The designated condition may include a condition in which a service being performed by the electronic device 500 is a service requiring a relatively high quality of service (QoS). A service requiring a high quality may require fast handover in order to ensure a high quality. The electronic device 500 may pre-designate a service (e.g., a voice call, a video call, and a mobile edge computing (MEC)) requiring a high quality from among services executable on the electronic device 500. Based on identification that the service being performed by the electronic device 500 is a designated service, the communication processor 510 may determine that the designated condition is satisfied. Alternatively, based on identification that the service being performed by the electronic device 500 is a designated service, the application processor 120 may determine that the designated condition is satisfied. Based on reception of information indicating that the electronic device 500 satisfies the designated condition from the application processor 120, the communication processor 510 may determine that the designated condition is satisfied.

The designated condition may include a condition in which the service being performed by the electronic device 500 is a service requiring a cellular communication connection to be maintained. A specific service (e.g., a voice call or a video call requiring real-time data transmission and/or reception) may be a service that cannot be performed when a cellular communication connection is disconnected. The electronic device 500 may pre-designate a service requiring a cellular communication connection to be maintained, from among services executable on the electronic device 500. Based on identification that the service being performed by the electronic device 500 is a designated service, the communication processor 510 may determine that the designated condition is satisfied. Alternatively, based on identification that the service being performed by the electronic device 500 is a designated service, the application processor 120 may determine that the designated condition is satisfied. Based on reception of information indicating that the electronic device 500 satisfies the designated condition from the application processor 120, the communication processor 510 may determine that the designated condition is satisfied.

The designated condition may include a condition in which the service being performed by the electronic device 500 is a service requiring fast handover. A specific service (e.g., a voice call or a video call requiring real-time data transmission and/or reception) is a service that cannot be performed when a cellular communication connection is disconnected, and fast handover may be required for maintaining the connection. The electronic device 500 may pre-designate a service requiring fast handover from among services executable on the electronic device 500. Based on identification that the service being performed by the electronic device 500 is a designated service, the communication processor 510 may determine that the designated condition is satisfied. Alternatively, based on identification that the service being performed by the electronic device 500 is a designated service, the application processor 120 may determine that the designated condition is satisfied. Based on reception of information indicating that the electronic device 500 satisfies the designated condition from the application processor 120, the communication processor 510 may determine that the designated condition is satisfied.

The designated condition may include a condition in which the electronic device 500 outputs a signal having a designated magnitude through the first antenna 531 and/or the second antenna 533, or a condition in which the electronic device 500 outputs a signal having a magnitude greater than the designated magnitude. The designated magnitude may be configured by various schemes, for example, the designated magnitude may be a high or maximum strength that the electronic device 500 is able to output. Based on identification that a strength of a signal output by the electronic device 500 is equal to the designated magnitude or is equal to or greater than the designated magnitude, the communication processor 510 may determine that the designated condition is satisfied. Alternatively, based on identification that a strength of a signal output by the electronic device 500 is equal to the designated magnitude or is equal to or greater than the designated magnitude, the application processor 120 may determine that the designated condition is satisfied. Based on reception of information indicating that the electronic device 500 satisfies the designated condition from the application processor 120, the communication processor 510 may determine that the designated condition is satisfied.

The designated condition may include a condition in which a difference between the first quality of the signal received through the first antenna 531 and the second quality of the signal received through the second antenna 533 is equal to or greater than (or exceeds) a designated value.

In the electronic device 500, performance of at least one of the first antenna 531 and the second antenna 533 may change for various reasons. If the performance of at least one of the first antenna 531 and the second antenna 533 changes, imbalance between the occur. Based on identification that a difference between the first quality of the signal received through the first antenna 531 and the second quality of the signal received through the second antenna 533 is equal to or greater than a designated value, the communication processor 510 may determine that the designated condition is satisfied. Alternatively, based on identification that a difference between the first quality of the signal received through the first antenna 531 and the second quality of the signal received through the second antenna 533 is equal to or greater than a designated value, the application processor 120 may determine that the designated condition is satisfied. Based on reception of information indicating that the electronic device 500 satisfies the designated condition from the application processor 120, the communication processor 510 may determine that the designated condition is satisfied.

Based on identification that the electronic device 500 satisfies the designated condition, the communication processor 510 may use a quality of a signal, which is received by an antenna capable of signal transmission or reception, for determination of whether a report condition is satisfied. The antenna capable of signal transmission or reception may be an antenna that is more important to a communication quality compared to an antenna performing diversity reception. Therefore, when the designated condition is satisfied, the electronic device 500 according to an example embodiment may determine whether the report condition is satisfied, by using the relatively more important antenna capable of signal transmission or reception.

Based on identification that the electronic device 500 satisfies the designated condition, the communication processor 510 may identify whether the first quality of the signal received by the first antenna 531 satisfies the report condition.

Referring to Table 2, in order to determine whether the report condition is satisfied, the communication processor 510 may use the signal quality of the first node 410 measured by the first antenna 531 from among the signal quality (−82 dBm) of the first node 410 measured by the first antenna 531 and the signal quality (−78 dBm) of the first node 410 measured by the second antenna 533. In order to determine whether the report condition is satisfied, the communication processor 510 may use the signal quality of the second node 420 measured by the first antenna 531 from among the signal quality (−76 dBm) of the second node 420 measured by the first antenna 531 and the signal quality (−73 dBm) of the second node 420 measured by the second antenna 533. The communication processor 510 may determine that the report condition is satisfied, based on identification that the signal quality (−76 dBm) of the second node 420 measured by the first antenna 531 is higher than the signal quality (−82 dBm) of the first node 410 measured by the first antenna 531 by a designated magnitude (e.g., 6 dBm) or greater.

Based on determination that the report condition is satisfied, the communication processor 510 may transmit a measurement report including identification information of the second node 420 and the signal quality (−76 dBm) of the second node 420 measured by the first antenna 531 to the cellular network 400 (or the first node 410 that is the connected node). The first node 410 having received the measurement report may determine whether to perform handover of the electronic device 500. Based on determination to perform handover of the electronic device 500, the first node 410 may transmit a handover request message of the electronic device 500 to a node (e.g., the second node 420) corresponding to identification information included in the measurement report. The second node 420 may perform a handover procedure with the electronic device 500 in response to reception of the handover request message.

Based on identification that the electronic device 500 does not satisfy the designated condition, the communication processor 510 may identify whether the better quality among the first quality of the signal received by the first antenna 531 and the second quality of the signal received by the second antenna 533 satisfies the report condition.

Referring to Table 2, in order to determine whether the report condition is satisfied, the communication processor 510 may use the signal quality (−78 dBm) of the first node 410 measured by the second antenna 533, which is the better quality, among the signal quality (−82 dBm) of the first node 410 measured by the first antenna 531 and the signal quality (−78 dBm) of the first node 410 measured by the second antenna 533. In order to determine whether the report condition is satisfied, the communication processor 510 may use the signal quality of the second node 420 measured by the second antenna 533, which is the better quality, among the signal quality (−76 dBm) of the second node 420 measured by the first antenna 531 and the signal quality (−73 dBm) of the second node 420 measured by the second antenna 533. The communication processor 510 may determine that the report condition is not satisfied, based on identification that the signal quality (−73 dBm) of the second node 420 measured by the second antenna 533 is not higher than the signal quality (−78 dBm) of the first node 410 measured by the second antenna 533 by a designated magnitude (e.g., 6 dBm) or greater. If the report condition is not satisfied, the communication processor 510 may not transmit a measurement report to the cellular network 400.

Based on identification that the electronic device 500 satisfies the designated condition, the communication processor 510 may perform calibration for at least one quality among the first quality of the signal received by the first antenna 531 and the second quality of the signal received by the second antenna 533.

Calibration for at least one quality among the first quality and the second quality may be calibration for reducing (or resolving) imbalance in the performance between the first antenna 531 and the second antenna 533.

The communication processor 510 may perform calibration for at least one quality among the first quality and the second quality by adding a designated value (e.g., offset) to the first quality among the first quality and the second quality, the first quality having been reduced due to imbalance in the performance.

For example, the communication processor 510 may perform calibration for the first quality by adding a designated value (e.g., 5 dBm) to the first quality, as illustrated in Table 3.

TABLE 3

|  | A signal quality of the first node 410 measured by the first antenna | A signal quality of the first node 410 measured by the second antenna | A signal quality of the second node 420 measured by the first antenna | A signal quality of the second node 420 measured by the second antenna |
|---|---|---|---|---|
| Before calibration | −82 dBm | −78 dBm | −76 dBm | −73 dBm |
| After calibration | −77 dBm | −78 dBm | −71 dBm | −73 dBm |

Referring to Table 3, in order to determine whether the report condition is satisfied, the communication processor 510 may use the calibrated signal quality of the first node 410 measured by the first antenna 531, which is the better quality, among the calibrated signal quality (−77 dBm) of the first node 410 measured by the first antenna 531 and the signal quality (−78 dBm) of the first node 410 measured by the second antenna 533. In order to determine whether the report condition is satisfied, the communication processor 510 may use the calibrated signal quality of the second node 420 measured by the first antenna 531, which is the better quality, among the calibrated signal quality (−71 dBm) of the second node 420 measured by the first antenna 531 and the signal quality (−73 dBm) of the second node 420 measured by the second antenna 533.

The communication processor 510 may determine that the report condition is satisfied, based on identification that the calibrated signal quality (−71 dBm) of the second node 420 measured by the first antenna 531 is higher than the signal quality (−77 dBm) of the first node 410 measured by the first antenna 531 by a designated magnitude (e.g., 6 dBm) or greater.

Alternatively, the communication processor 510 may perform calibration for at least one quality among the first quality and the second quality by subtracting a designated value (e.g., offset) from the second quality corresponding to the second antenna 533 from among the first quality and second quality, the performance of the second quality not being reduced.

For example, the communication processor 510 may perform calibration for the second quality by subtracting a designated value (e.g., 5 dBm) from the second quality, as illustrated in Table 4.

the first node 410 measured by the second antenna 533. In order to determine whether the report condition is satisfied, the communication processor 510 may use the signal quality of the second node 420 measured by the first antenna 531 from among the signal quality (−76 dBm) of the second node 420 measured by the first antenna 531 and the calibrated signal quality (−79 dBm) of the second node 420 measured by the second antenna 533. The communication processor 510 may determine that the report condition is satisfied, based on identification that the signal quality (−76 dBm) of the second node 420 measured by the first antenna 531 is higher than the signal quality (−82 dBm) of the first node 410 measured by the first antenna 531 by a designated magnitude (e.g., 6 dBm) or greater.

The designated values used for calibration of the first quality and the second quality may be configured differently depending on a signal frequency band. According to an embodiment, depending on satisfaction of the designated condition, a designated value of a frequency band in which relatively greater imbalance occurs in performance of antennas may be configured to be larger than a designated value of a frequency band in which relatively less imbalance occurs in performance of antennas.

The designated values used for calibration of the first quality and the second quality may be configured differently depending on a quality of a signal received by the electronic device 500. According to an embodiment, designated values used for calibration of the first quality and the second quality in a situation where the electronic device 500 is located in a strong electric field may be configured to be larger than or configured to be smaller than designated values used for calibration of the first quality and the second quality in a situation where the electronic device 500 is located in a weak electric field.

The designated values used for calibration of the first quality and the second quality may be configured differently

TABLE 4

|  | A signal quality of the first node 410 measured by the first antenna | A signal quality of the first node 410 measured by the second antenna | A signal quality of the second node 420 measured by the first antenna | A signal quality of the second node 420 measured by the second antenna |
|---|---|---|---|---|
| Before calibration | −82 dBm | −78 dBm | −76 dBm | −73 dBm |
| After calibration | −82 dBm | −83 dBm | −76 dBm | −79 dBm |

Referring to Table 4, in order to determine whether the report condition is satisfied, the communication processor 510 may use the signal quality of the first node 410 measured by the first antenna 531 from among the signal quality (−82 dBm) of the first node 410 measured by the first antenna 531 and the calibrated signal quality (−83 dBm) of depending on antennas. According to an example, if the electronic device 500 satisfies the designated condition, a degree of change in the performance of the first antenna 531 and a degree of change in the performance of the second antenna 533 may be different. Accordingly, the designated value used for calibration of the first quality may be configured differently from the designated value used for calibration of the second quality.

The communication processor 510 may perform calibration for at least one quality among the first quality and the second quality by multiplying each of the first quality and the second quality by a weighting factor. The communication processor 510 may identify whether a value obtained by multiplying the first quality by a first weighting factor and a value obtained by multiplying the second quality by a second weighting factor satisfy the report condition.

For example, as illustrated in Table 5, the communication processor 510 may perform calibration for the first quality by multiplying the first quality by the first weighting factor (e.g., 0.5), and perform calibration for the second quality by multiplying the second quality by the second weighting factor (e.g., 0.5).

TABLE 5

| | A signal quality of the first node 410 measured by the first antenna | A signal quality of the first node 410 measured by the second antenna | A signal quality of the second node 420 measured by the first antenna | A signal quality of the second node 420 measured by the second antenna |
|---|---|---|---|---|
| Before calibration | −82 dBm | −78 dBm | −74 dBm | −73 dBm |
| Weighting factors | 0.5 | 0.5 | 0.5 | 0.5 |
| After calibration | −80 dBm(−82 dBm * 0.5 +− 78 dBm * 0.5) | | −73.5 dBm(−74 dBm * 0.5 +− 73 dBm * 0.5) | |

Referring to Table 5, the communication processor 510 may configure, as the calibrated signal quality of the first node 410, a value (−80 dBm) obtained by adding a value (−41 dBm) obtained by multiplexing the signal quality (−82 dBm) of the first node 410, which the first antenna 531 has measured, by the first weighting factor (0.5) and a value (−39 dBm) obtained by multiplexing the signal quality (−78 dBm) of the second node 420, which the second antenna 533 has measured, by the second weighting factor (0.5). The communication processor 510 may configure, as the calibrated signal quality of the second node 420, a value (−73.5 dBm) obtained by adding a value (−37 dBm) obtained by multiplexing the signal quality (−74 dBm) of the second node 420, which the first antenna 531 has measured, by the first weighting factor (0.5) and a value (−36.5 dBm) obtained by multiplexing the signal quality (−73 dBm) of the second node 420, which the second antenna 533 has measured, by the second weighting factor.

The first weighting factor and the second weighting factor may be configured differently according to various schemes.

The first weighting factor and the second weighting factor may be configured differently according to signal frequency bands. According to satisfaction of the designated condition, a weighting factor of a frequency band in which relatively greater imbalance occurs in performance of antennas may be configured to be larger than a weighting factor of a frequency band in which relatively less imbalance occurs in performance of antennas.

The first weighting factor and the second weighting factor may be configured differently depending on a signal quality of a signal received by the electronic device 500, and may also be configured differently depending on antennas.

The communication processor 510 may determine that the report condition is satisfied, based on identification that the calibrated signal quality (−73.5 dBm) of the second node 420 is equal to or greater than (or exceeds) the calibrated signal quality (−80 dBm) of the first node 410 by the designated value.

Based on determination that the report condition is satisfied, the communication processor 510 may transmit a measurement report including identification information of the second node 420 and the calibrated signal quality of the second node 420 to the cellular network 400 (or the first node 410 that is the connected node). The first node 410 having received the measurement report may determine whether to perform handover of the electronic device 500. Based on determination to perform handover of the electronic device 500, the first node 410 may transmit a handover request message of the electronic device 500 to a node (e.g., the second node 420) corresponding to identification information included in the measurement report. The second node 420 may perform a handover procedure with the electronic device 500 in response to reception of the handover request message.

Alternatively, based on identification that the electronic device 500 satisfies the designated condition, the communication processor 510 may identify whether one quality among the first quality and the second quality satisfies the report condition. If even one quality among the first quality and the second quality satisfies the report condition, the communication processor 510 may transmit a measurement report including the quality satisfying the report condition to the cellular network 400.

For the electronic device 500 according to an example embodiment, via the described embodiments, the electronic device 500 may be induced to perform faster handover, and a radio link failure (RLF) that may occur due to late handover may be prevented or reduced.

Figure 6:
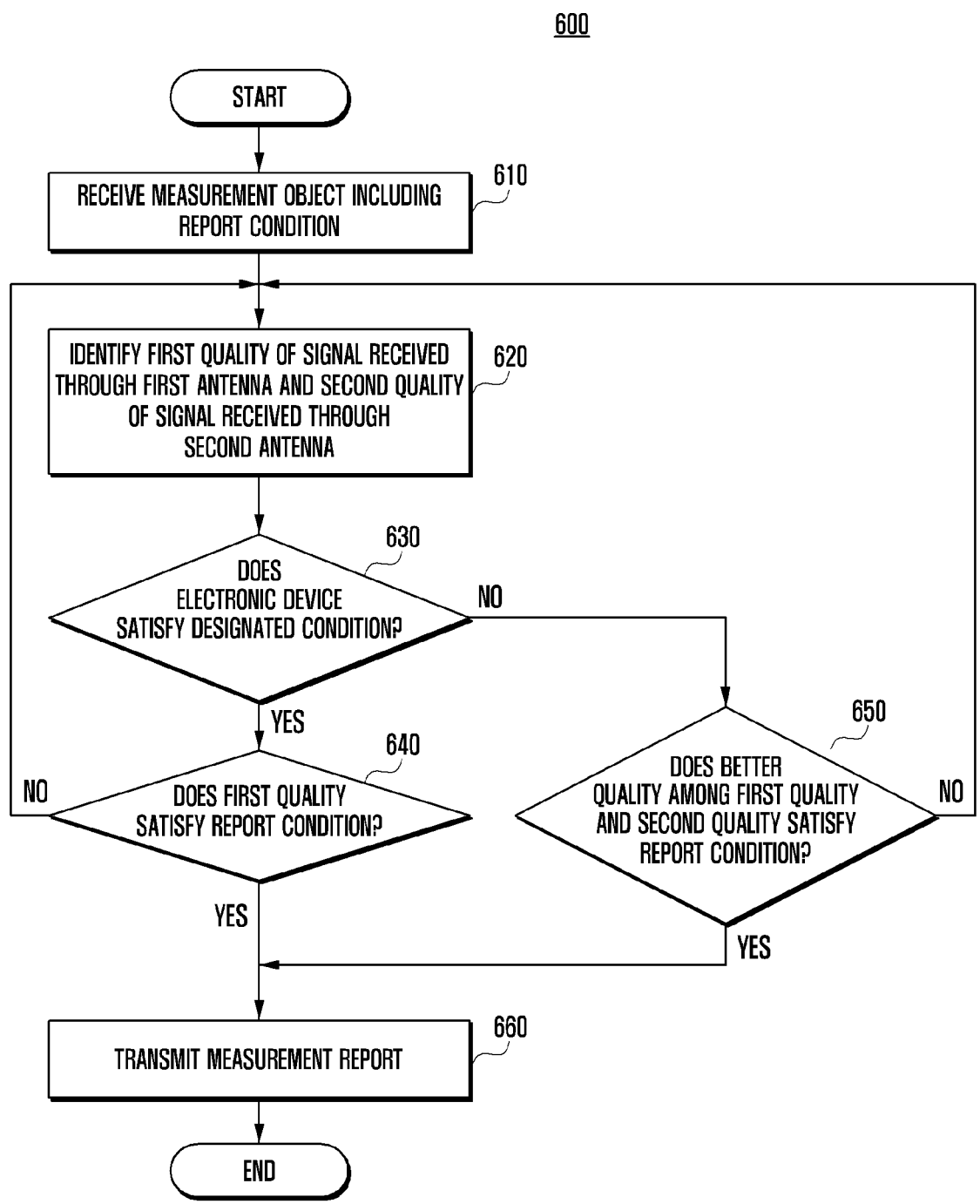
FIG. 6 is a diagram illustrating an embodiment in which an electronic device determines, based on whether a designated condition is satisfied, whether a first quality satisfies a report condition or whether the better quality among the first quality and a second quality satisfies the report condition, according to an example embodiment.

FIG. 6 is a diagram illustrating an embodiment 600 in which an electronic device determines, based on whether a designated condition is satisfied, whether a first quality satisfies a report condition or whether the better quality among the first quality and a second quality satisfies the report condition, according to an example embodiment.

Referring to FIG. 6, in operation 610, an electronic device (e.g., the electronic device 500 of FIG. 5) may receive a measurement object including a report condition from a cellular network (e.g., the cellular network 400 of FIG. 4).

The electronic device 500 may receive an RRC reconfiguration message while connecting to or when connected to a first node (e.g., the first node 410 of FIG. 4).

The RRC reconfiguration message may include information on a node (or a node adjacent to the first node 410) (e.g., the second node 420 and/or the third node 430) adjacent to the electronic device 500. Information on a node adjacent to the electronic device 500 may include information on a measurement object (measObject) and/or information on a report condition (report object), the information being related to the second node 420 and/or the third node 430 which are nodes adjacent to the electronic device 500 (or adjacent to the first node 410).

The measurement object is information required for the electronic device 500 to perform measurement, and may include frequency band information (e.g., channel information) for performing node search and quality measurement of a searched node, and/or identification information (e.g., a physical cell ID) of a node outputting a signal of a frequency band included in the frequency band information. The report condition is a condition for reporting a measured quality, and may include identification information of an event (e.g., event A3 that is a condition in which a signal strength of an adjacent node is greater than a signal strength of a connected node by a specific value or greater, and event A5 that is a condition in which a signal strength of a connected node is less than a designated magnitude, and a signal strength of an adjacent node is greater than the designated magnitude) related to a quality report, a designated value (threshold) related to a quality of a signal transmitted by the node, and/or a time (time to trigger (TTT)) during which satisfaction of the quality-related condition is maintained.

In operation 620, the electronic device 500 may identify a first quality of a signal received through a first antenna (e.g., the first antenna 531 of FIG. 5) and a second quality of a signal received through a second antenna (e.g., the second antenna 533 of FIG. 5).

When connected to the first node 410, the electronic device 500 may measure a quality of a signal transmitted by the first node 410 and/or a quality of a signal transmitted by a node (e.g., the second node 420 and/or the third node 430) adjacent to the electronic device 500, which is included in the measurement object.

The electronic device 500 may receive signals transmitted (e.g., broadcast) by the first node 410 through the first antenna 531 and the second antenna 533, based on the identification information of the first node 410. The electronic device 500 may identify the first quality of the signal received through the first antenna 531 and the second quality of the signal received through the second antenna 533.

The electronic device 500 may identify, in operation 630, whether the electronic device 500 satisfies a designated condition.

The designated condition may include a condition in which a difference between the first quality of the signal received through the first antenna 531 and the second quality of the signal received through the second antenna 533 is equal to or greater than (or exceeds) a designated value.

The designated condition may include a condition related to occurrence (or increase) of imbalance between performance of the first antenna 531 and performance of the second antenna 533.

In the electronic device 500, performance of at least one of the first antenna 531 and the second antenna 533 may change for various reasons. If the performance of at least one of the first antenna 531 and the second antenna 533 changes, imbalance between the performance of the first antenna 531 and the performance of the second antenna 533 may occur.

The designated condition may include a condition in which the electronic device 500 is connected to an external electronic device via a port. For example, at least a part of the first antenna 531 may be implemented on the housing of the electronic device 500. When an external electronic device (e.g., a charger or an earphone) is connected via a port (e.g., a universal series bus (USB)) of the electronic device 500, the performance of the first antenna 533 may be degraded due to the external electronic device. The electronic device 500 may detect that the electronic device 500 is connected to the external electronic device via a port, and determine that the designated condition is satisfied.

The designated condition may include a condition that a state of a form factor of the housing of the electronic device 500 is changed. The housing of the electronic device 500 may be implemented as a foldable housing, and the first antenna 531 and the second antenna 533 may be implemented as parts of the housing. If a state of the housing of the electronic device 500 changes (e.g., changes from an unfolded state to a folded state), a distance between the first antenna 531 and the second antenna 533 may become close, and isolation for ensuring the performance of the first antenna 531 and the second antenna 533 may be reduced, so that the performance of the performance of the first antenna 531 and the second antenna 533 may be degraded. The electronic device 500 may detect a change of the state of the form factor of the electronic device 500 via various sensors (e.g., a Hall sensor), and determine that a designated condition is satisfied.

The designated condition may include a condition of detecting that the external object contacts or approaches the electronic device 500. For example, the first antenna 531 and/or the second antenna 533 may be implemented via the housing of the electronic device 500. When an external object contacts or approaches a part of the housing of the electronic device 500, where the first antenna 531 is implemented, the performance of the first antenna 531 may be degraded due to the external object. The electronic device 500 may detect the contact or approach of the external object via various sensors (e.g., a proximity sensor), and determine that a designated condition is satisfied.

The designated condition described above may be a condition related to a physical event occurring on the electronic device 500. The designated condition may include various conditions that may affect the performance of the first antenna 531 and/or the second antenna 533.

The designated condition may include a condition in which a service being performed by the electronic device 500 is a service requiring a relatively high quality of service (QoS). A service requiring a high quality may require fast handover in order to ensure a high quality. The electronic device 500 may pre-designate a service (e.g., a voice call, a video call, and a mobile edge computing (MEC)) requiring a high quality from among services executable on the electronic device 500. Based on identification that the service being performed by the electronic device 500 is a designated service, the electronic device 500 may determine that the designated condition is satisfied.

The designated condition may include a condition in which the service being performed by the electronic device 500 is a service requiring a cellular communication connection to be maintained. A specific service (e.g., a voice call or a video call requiring real-time data transmission and/or reception) may be a service that cannot be performed when a cellular communication connection is disconnected. The electronic device 500 may pre-designate a service requiring a cellular communication connection to be maintained, from among services executable on the electronic device 500. Based on identification that the service being performed by the electronic device 500 is a designated service, the electronic device 500 may determine that the designated condition is satisfied.

The designated condition may include a condition in which the service being performed by the electronic device 500 is a service requiring fast handover. A specific service (e.g., a voice call or a video call requiring real-time data transmission and/or reception) is a service that cannot be performed when a cellular communication connection is disconnected, and fast handover may be required for maintaining the connection. The electronic device 500 may pre-designate a service requiring fast handover from among services executable on the electronic device 500. Based on identification that the service being performed by the electronic device 500 is a designated service, the electronic device 500 may determine that the designated condition is satisfied.

The designated condition may include a condition in which the electronic device 500 outputs a signal having a designated magnitude through the first antenna 531 and/or the second antenna 533, or a condition in which the electronic device 500 outputs a signal having a magnitude greater than the designated magnitude. The designated magnitude may be configured by various schemes, for example, the designated magnitude may be a high or maximum strength that the electronic device 500 is able to output. Based on identification that a strength of a signal output by the electronic device 500 is equal to the designated magnitude or is equal to or greater than the designated magnitude, the electronic device 500 may determine that the designated condition is satisfied.

The designated condition may include a condition in which a difference between the first quality of the signal received through the first antenna 531 and the second quality of the signal received through the second antenna 533 is equal to or greater than (or exceeds) a designated value.

In the electronic device 500, performance of at least one of the first antenna 531 and the second antenna 533 may change for various reasons. If the performance of at least one of the first antenna 531 and the second antenna 533 changes, imbalance between the performance of the first antenna 531 and the performance of the second antenna 533 may occur. Based on identification that a difference between the first quality of the signal received through the first antenna 531 and the second quality of the signal received through the second antenna 533 is equal to or greater than a designated value, the electronic device 500 may determine that the designated condition is satisfied.

In operation 640, the electronic device 500 may identify, based on that the electronic device 500 satisfies the designated condition (operation 630—Y), whether the first quality satisfies the report condition.

Based on identification that the electronic device 500 satisfies the designated condition, the electronic device 500 may use a quality of a signal, which is received by an antenna capable of signal transmission or reception, for determination of whether the report condition is satisfied. The antenna capable of signal transmission or reception may be an antenna that is more important to a communication quality compared to an antenna performing diversity reception. Therefore, when the designated condition is satisfied, the electronic device 500 according to an example embodiment may determine whether the report condition is satisfied, by using the relatively more important antenna capable of signal transmission or reception.

Based on identification that the electronic device 500 satisfies the designated condition, the electronic device 500 may identify whether the first quality of the signal received by the first antenna 531 satisfies the report condition.

In operation 650, the electronic device 500 may identify, based on that the electronic device 500 does not satisfy the designated condition (operation 630—N), whether the better quality among the first quality and the second quality satisfies the report condition.

In operation 660 (e.g., after a yes in operation 640 and/or a yes in operation 650), the electronic device 500 may transmit a measurement report to the cellular network 400.

Based on determination that the report condition is satisfied (e.g., operation 640—Yes and/or operation 650—Yes), the electronic device 500 may transmit the measurement report including identification information of the second node 420 and the signal quality of the second node 420 measured by the first antenna 531 to the cellular network 400 (or the first node 410 that is the connected node) in operation 660. The first node 410 having received the measurement report may determine whether to perform handover of the electronic device 500. Based on determination to perform handover of the electronic device 500, the first node 410 may transmit a handover request message of the electronic device 500 to a node (e.g., the second node 420) corresponding to identification information included in the measurement report. The second node 420 may perform a handover procedure with the electronic device 500 in response to reception of the handover request message.

Figure 7:
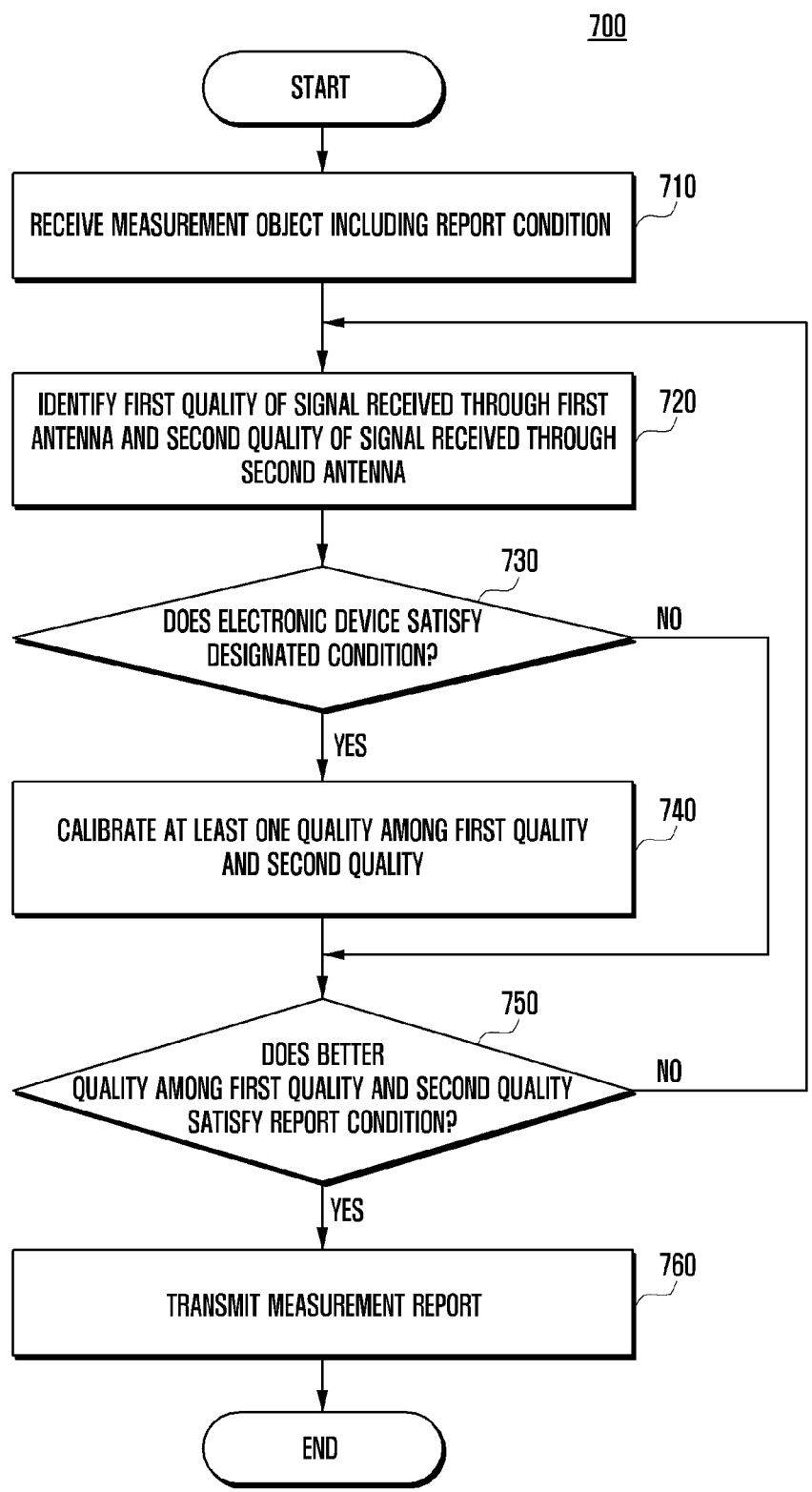
FIG. 7 is a diagram illustrating an embodiment in which an electronic device calibrates at least one quality among a first quality and a second quality, based on whether a designated condition is satisfied, according to an example embodiment.

FIG. 7 is a diagram illustrating an embodiment 700 in which an electronic device calibrates at least one quality among a first quality and a second quality, based on whether a designated condition is satisfied, according to an example embodiment.

Referring to FIG. 7, in operation 710, an electronic device (e.g., the electronic device 500 of FIG. 5) may receive a measurement object including a report condition from a cellular network (e.g., the cellular network 400 of FIG. 4).

The electronic device 500 may receive an RRC reconfiguration message while connecting to or when connected to a first node (e.g., the first node 410 of FIG. 4).

The RRC reconfiguration message may include information on a node (or a node adjacent to the first node 410) (e.g., the second node 420 and/or the third node 430) adjacent to the electronic device 500. Information on a node adjacent to the electronic device 500 may include information on a measurement object (measObject) and/or information on a report condition (report object), the information being related to the second node 420 and/or the third node 430 which are nodes adjacent to the electronic device 500 (or adjacent to the first node 410).

The measurement object is information required for the electronic device 500 to perform measurement, and may include frequency band information (e.g., channel information) for performing node search and quality measurement of a searched node, and/or identification information (e.g., a physical cell ID) of a node outputting a signal of a frequency band included in the frequency band information. The report condition is a condition for reporting a measured quality, and may include identification information of an event (e.g., event A3 that is a condition in which a signal strength of an adjacent node is greater than a signal strength of a connected node by a specific value or greater, and event A5 that is a condition in which a signal strength of a connected node is less than a designated magnitude, and a signal strength of an adjacent node is greater than the designated magnitude) related to a quality report, a designated value (threshold) related to a quality of a signal transmitted by the node, and/or a time (time to trigger (TTT)) during which satisfaction of the quality-related condition is maintained.

In operation 720, the electronic device 500 may identify a first quality of a signal received through a first antenna (e.g., the first antenna 531 of FIG. 5) and a second quality of a signal received through a second antenna (e.g., the second antenna 533 of FIG. 5).

When connected to the first node 410, the electronic device 500 may measure a quality of a signal transmitted by the first node 410 and/or a quality of a signal transmitted by a node (e.g., the second node 420 and/or the third node 430) adjacent to the electronic device 500, which is included in the measurement object.

The electronic device 500 may receive signals transmitted (or broadcast) by the first node 410 through the first antenna 531 and the second antenna 533, based on the identification information of the first node 410. The electronic device 500 may identify the first quality of the signal received through the first antenna 531 and the second quality of the signal received through the second antenna 533.

The electronic device 500 may identify, in operation 730, whether the electronic device 500 satisfies a designated condition.

The designated condition may include a condition in which a difference between the first quality of the signal received through the first antenna 531 and the second quality of the signal received through the second antenna 533 is equal to or greater than (or exceeds) a designated value.

The designated condition may include a condition related to occurrence (or increase) of imbalance between performance of the first antenna 531 and performance of the second antenna 533.

In the electronic device 500, performance of at least one of the first antenna 531 and the second antenna 533 may change for various reasons. If the performance of at least one of the first antenna 531 and the second antenna 533 changes, imbalance between the performance of the first antenna 531 and the performance of the second antenna 533 may Occur.

The designated condition may include a condition in which the electronic device 500 is connected to an external electronic device via a port. For example, at least a part of the first antenna 531 may be implemented on the housing of the electronic device 500. When an external electronic device (e.g., a charger or an earphone) is connected via a port (e.g., a universal series bus (USB)) of the electronic device 500, the performance of the first antenna 533 may be degraded due to the external electronic device. The electronic device 500 may detect that the electronic device 500 is connected to the external electronic device via a port, and determine that the designated condition is satisfied.

The designated condition may include a condition that a state of a form factor of the housing of the electronic device 500 is changed. The housing of the electronic device 500 may be implemented as a foldable housing, and the first antenna 531 and the second antenna 533 may be implemented as parts of the housing. If a state of the housing of the electronic device 500 changes (e.g., changes from an unfolded state to a folded state), a distance between the first antenna 531 and the second antenna 533 may become close, and isolation for ensuring the performance of the first antenna 531 and the second antenna 533 may be reduced, so that the performance of the performance of the first antenna 531 and the second antenna 533 may be degraded. The electronic device 500 may detect a change of the state of the form factor of the electronic device 500 via various sensors (e.g., a Hall sensor), and determine that a designated condition is satisfied.

The designated condition may include a condition of detecting that the external object contacts or approaches the electronic device 500. For example, the first antenna 531 and/or the second antenna 533 may be implemented via the housing of the electronic device 500. When an external object contacts or approaches a part of the housing of the electronic device 500, where the first antenna 531 is implemented, the performance of the first antenna 531 may be degraded due to the external object. The electronic device 500 may detect the contact or approach of the external object via various sensors (e.g., a proximity sensor), and determine that a designated condition is satisfied.

The designated condition described above may be a condition related to a physical event occurring on the electronic device 500. The designated condition may include various conditions that may affect the performance of the first antenna 531 and/or the second antenna 533.

The designated condition may include a condition in which a service being performed by the electronic device 500 is a service requiring a relatively high quality of service (QoS). A service requiring a high quality may require fast handover in order to ensure a high quality. The electronic device 500 may pre-designate a service (e.g., a voice call, a video call, and a mobile edge computing (MEC)) requiring a high quality from among services executable on the electronic device 500. Based on identification that the service being performed by the electronic device 500 is a designated service, the electronic device 500 may determine that the designated condition is satisfied.

The designated condition may include a condition in which the service being performed by the electronic device 500 is a service requiring a cellular communication connection to be maintained. A specific service (e.g., a voice call or a video call requiring real-time data transmission and/or reception) may be a service that cannot be performed when a cellular communication connection is disconnected. The electronic device 500 may pre-designate a service requiring a cellular communication connection to be maintained, from among services executable on the electronic device 500. Based on identification that the service being performed by the electronic device 500 is a designated service, the electronic device 500 may determine that the designated condition is satisfied.

The designated condition may include a condition in which the service being performed by the electronic device 500 is a service requiring fast handover. A specific service (e.g., a voice call or a video call requiring real-time data transmission and/or reception) is a service that cannot be performed when a cellular communication connection is disconnected, and fast handover may be required for maintaining the connection. The electronic device 500 may pre-designate a service requiring fast handover from among services executable on the electronic device 500. Based on identification that the service being performed by the electronic device 500 is a designated service, the electronic device 500 may determine that the designated condition is satisfied.

The designated condition may include a condition in which the electronic device 500 outputs a signal having a designated magnitude through the first antenna 531 and/or the second antenna 533, or a condition in which the electronic device 500 outputs a signal having a magnitude greater than the designated magnitude. The designated magnitude may be configured by various schemes, for example, the designated magnitude may be a high or maximum strength that the electronic device 500 is able to output. Based on identification that a strength of a signal output by the electronic device 500 is equal to the designated magnitude or is equal to or greater than the designated magnitude, the electronic device 500 may determine that the designated condition is satisfied.

The designated condition may include a condition in which a difference between the first quality of the signal received through the first antenna 531 and the second quality of the signal received through the second antenna 533 is equal to or greater than (or exceeds) a designated value.

In the electronic device 500, performance of at least one of the first antenna 531 and the second antenna 533 may change for various reasons. If the performance of at least one of the first antenna 531 and the second antenna 533 changes, imbalance between the performance of the first antenna 531 and the performance of the second antenna 533 may occur. Based on identification that a difference between the first quality of the signal received through the first antenna 531 and the second quality of the signal received through the second antenna 533 is equal to or greater than a designated value, the electronic device 500 may determine that the designated condition is satisfied.

In operation 740, the electronic device 500 may calibrate at least one quality among the first quality and the second quality, based on that the electronic device satisfies the designated condition (operation 730—Y).

Calibration for at least one quality among the first quality and the second quality may be calibration for reducing (or resolving) imbalance in the performance between the first antenna 531 and the second antenna 533.

The electronic device 500 may perform calibration for at least one quality among the first quality and the second quality by adding a designated value (e.g., offset) to the first quality among the first quality and the second quality, the first quality having been reduced due to imbalance in the performance.

In order to determine whether the report condition is satisfied, the electronic device 500 may use the better quality (e.g., the calibrated signal quality of the first node 410 measured by the first antenna 531) among the calibrated signal quality of the first node 410 measured by the first antenna 531 and the signal quality of the first node 410 measured by the second antenna 533. In order to determine whether the report condition is satisfied, the electronic device 500 may use the better quality (e.g., the calibrated signal quality of the second node 420 measured by the first antenna 531) among the calibrated signal quality of the second node 420 measured by the first antenna 531 and the signal quality of the second node 420 measured by the second antenna 533.

The electronic device 500 may perform calibration for at least one quality among the first quality and the second quality by subtracting a designated value (e.g., offset) from the second quality corresponding to the second antenna 533 from among the first quality and the second quality, the performance of the second quality not being reduced.

In order to determine whether the report condition is satisfied, the electronic device 500 may use the better quality (e.g., the signal quality of the first node 410 measured by the first antenna 531) among the signal quality of the first node 410 measured by the first antenna 531 and the calibrated signal quality of the first node 410 measured by the second antenna 533. In order to determine whether the report condition is satisfied, the electronic device 500 may use the better quality (e.g., the signal quality of the second node 420 measured by the first antenna 531) among the signal quality of the second node 420 measured by the first antenna 531 and the calibrated signal quality of the second node 420 measured by the second antenna 533.

The designated values used for calibration of the first quality and the second quality may be configured differently depending on a signal frequency band. According to an embodiment, depending on satisfaction of the designated condition, a designated value of a frequency band in which relatively greater imbalance occurs in performance of antennas may be configured to be larger than a designated value of a frequency band in which relatively less imbalance occurs in performance of antennas.

The designated values used for calibration of the first quality and the second quality may be configured differently depending on a quality of a signal received by the electronic device 500. According to an embodiment, designated values used for calibration of the first quality and the second quality in a situation where the electronic device 500 is located in a strong electric field may be configured to be larger than or configured to be smaller than designated values used for calibration of the first quality and the second quality in a situation where the electronic device 500 is located in a weak electric field.

The designated values used for calibration of the first quality and the second quality may be configured differently depending on antennas. According to an example, if the electronic device 500 satisfies the designated condition, a degree of change in the performance of the first antenna 531 and a degree of change in the performance of the second antenna 533 may be different. Accordingly, the designated value used for calibration of the first quality may be configured differently from the designated value used for calibration of the second quality.

The electronic device 500 may perform calibration for at least one quality among the first quality and the second quality by multiplying each of the first quality and the second quality by a weighting factor. The communication processor 510 may identify whether a value obtained by multiplying the first quality by a first weighting factor and a value obtained by multiplying the second quality by a second weighting factor satisfy the report condition.

The electronic device 500 may configure, as the calibrated signal quality of the first node 410, the sum of the product of the first weighting factor and the signal quality of the first node 410 measured by the first antenna 531 and the product of the second weighting factor and the signal quality of the second node 420 measured by the second antenna 533. The electronic device 500 may configure, as the calibrated signal quality of the second node 420, the sum of the product of the first weighting factor and the signal quality of the second node 420 measured by the first antenna 531 and the product of the second weighting factor and the signal quality of the second node 420 measured by the second antenna 533.

The first weighting factor and the second weighting factor may be configured differently according to signal frequency bands. According to satisfaction of the designated condition, a weighting factor of a frequency band in which relatively greater imbalance occurs in performance of antennas may be configured to be larger than a weighting factor of a frequency band in which relatively less imbalance occurs in performance of antennas.

The first weighting factor and the second weighting factor may be configured differently depending on a signal quality of a signal received by the electronic device 500, and may also be configured differently depending on antennas.

In operation 750, the electronic device 500 may identify whether the better quality among the first quality and the second quality satisfies the report condition.

The electronic device 500 may identify, based on that the electronic device 500 satisfies the designated condition (operation 730—Y), whether the calibrated quality satisfies the report condition.

The electronic device 500 may determine that the report condition is satisfied, based on identification that the calibrated signal quality of the second node 420 measured by the first antenna 531 is higher than the signal quality of the first node 410 measured by the first antenna 531 by a designated magnitude or greater.

The electronic device 500 may identify, based on that the electronic device 500 does not satisfy the designated condition (operation 730—N), whether the quality that is not calibrated satisfies the report condition.

In operation 760, if the report condition is satisfied (operation 750—Y), the electronic device 500 may transmit a measurement report.

Based on determination that the report condition is satisfied, the electronic device 500 may transmit the measurement report including identification information of the second node 420 or the calibrated signal quality of the second node 420 to the cellular network 400 (or the first node 410 that is the connected node). The first node 410 having received the measurement report may determine whether to perform handover of the electronic device 500. Based on determination to perform handover of the electronic device 500, the first node 410 may transmit a handover request message of the electronic device 500 to a node (e.g., the second node 420) corresponding to identification information included in the measurement report. The second node 420 may perform a handover procedure with the electronic device 500 in response to reception of the handover request message.

Figure 8:
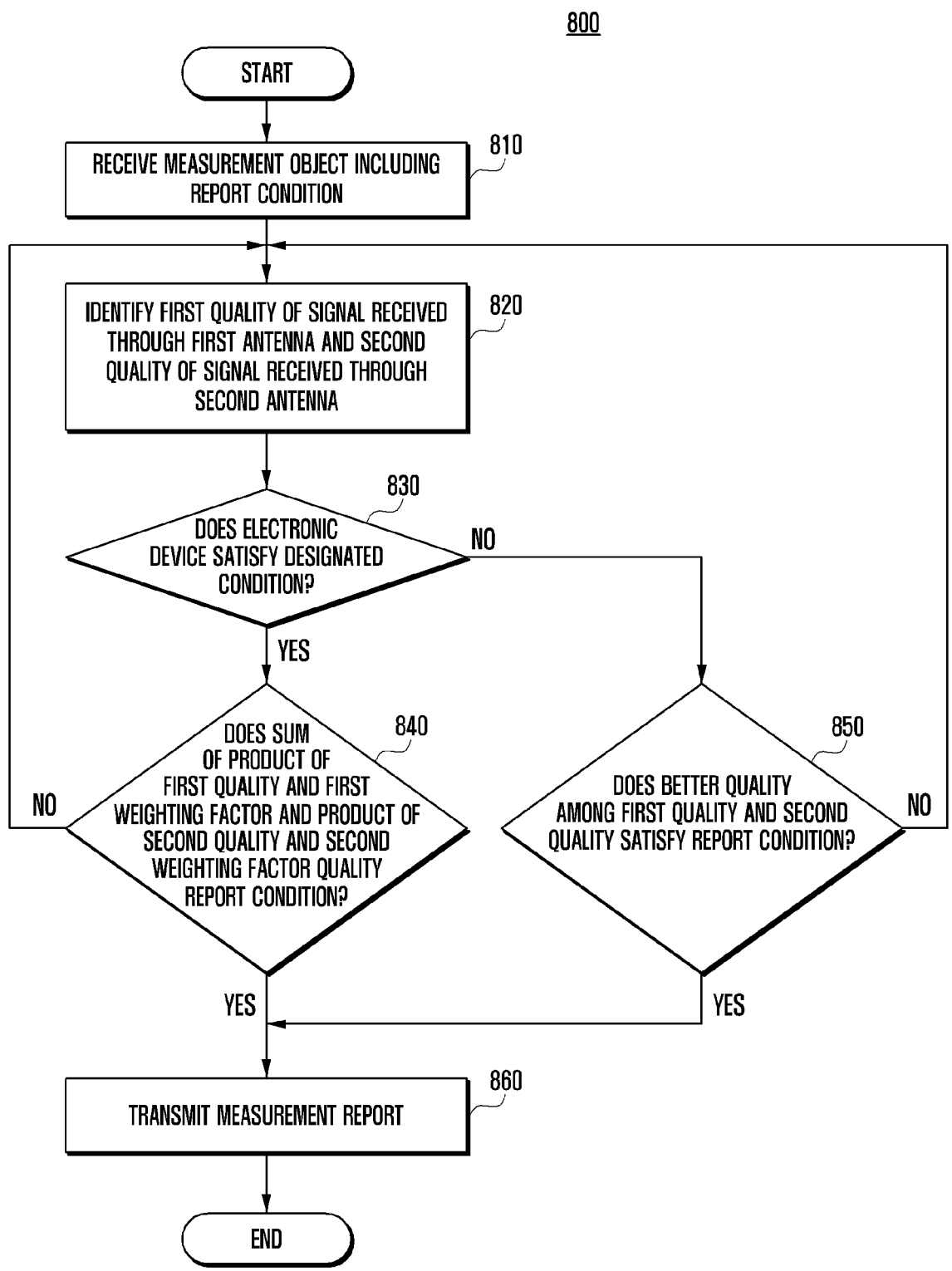
FIG. 8 is a diagram illustrating an embodiment in which an electronic device determines, based on whether a designated condition is satisfied, whether the sum of the product of a first quality and a first weighting factor and the product of a second quality and a second weighting factor satisfies a report condition, or whether the better quality among the first quality and the second quality satisfies the report condition, according to an example embodiment.

FIG. 8 is a diagram illustrating an embodiment 800 in which an electronic device determines, based on whether a designated condition is satisfied, whether the sum of the product of a first quality and a first weighting factor and the product of a second quality and a second weighting factor satisfies a report condition, or whether the better quality among the first quality and the second quality satisfies the report condition, according to an example embodiment.

Referring to FIG. 8, in operation 810, an electronic device (e.g., the electronic device 500 of FIG. 5) may receive a measurement object including a report condition from a cellular network (e.g., the cellular network 400 of FIG. 4).

The electronic device 500 may receive an RRC reconfiguration message while connecting to or when connected to a first node (e.g., the first node 410 of FIG. 4).

The RRC reconfiguration message may include information on a node (or a node adjacent to the first node 410) (e.g., the second node 420 and/or the third node 430) adjacent to the electronic device 500. Information on a node adjacent to the electronic device 500 may include information on a measurement object (measObject) and/or information on a report condition (report object), the information being related to the second node 420 and/or the third node 430 which are nodes adjacent to the electronic device 500 (or adjacent to the first node 410).

The measurement object is information required for the electronic device 500 to perform measurement, and may include frequency band information (e.g., channel information) for performing node search and quality measurement of a searched node, and/or identification information (e.g., a physical cell ID) of a node outputting a signal of a frequency band included in the frequency band information. The report condition is a condition for reporting a measured quality, and may include identification information of an event (e.g., event A3 that is a condition in which a signal strength of an adjacent node is greater than a signal strength of a connected node by a specific value or greater, and event A5 that is a condition in which a signal strength of a connected node is less than a designated magnitude, and a signal strength of an adjacent node is greater than the designated magnitude) related to a quality report, a designated value (threshold) related to a quality of a signal transmitted by the node, and/or a time (time to trigger (TTT)) during which satisfaction of the quality-related condition is maintained.

In operation 820, the electronic device 500 may identify a first quality of a signal received through a first antenna (e.g., the first antenna 531 of FIG. 5) and a second quality of a signal received through a second antenna (e.g., the second antenna 533 of FIG. 5).

When connected to the first node 410, the electronic device 500 may measure a quality of a signal transmitted by the first node 410 and/or a quality of a signal transmitted by a node (e.g., the second node 420 and/or the third node 430) adjacent to the electronic device 500, which is included in the measurement object.

The electronic device 500 may receive signals transmitted (or broadcast) by the first node 410 through the first antenna 531 and the second antenna 533, based on the identification information of the first node 410. The electronic device 500 may identify the first quality of the signal received through the first antenna 531 and the second quality of the signal received through the second antenna 533.

The electronic device 500 may identify, in operation 830, whether the electronic device 500 satisfies a designated condition.

The designated condition may include a condition in which a difference between the first quality of the signal received through the first antenna 531 and the second quality of the signal received through the second antenna 533 is equal to or greater than (or exceeds) a designated value.

The designated condition may include a condition related to occurrence (or increase) of imbalance between performance of the first antenna 531 and performance of the second antenna 533.

In the electronic device 500, performance of at least one of the first antenna 531 and the second antenna 533 may change for various reasons. If the performance of at least one of the first antenna 531 and the second antenna 533 changes, imbalance between the performance of the first antenna 531 and the performance of the second antenna 533 may occur.

The designated condition may include a condition in which the electronic device 500 is connected to an external electronic device via a port. For example, at least a part of the first antenna 531 may be implemented on the housing of the electronic device 500. When an external electronic device (e.g., a charger or an earphone) is connected via a port (e.g., a universal series bus (USB)) of the electronic device 500, the performance of the first antenna 533 may be degraded due to the external electronic device. The electronic device 500 may detect that the electronic device 500 is connected to the external electronic device via a port, and determine that the designated condition is satisfied.

The designated condition may include a condition that a state of a form factor of the housing of the electronic device 500 is changed. The housing of the electronic device 500 may be implemented as a foldable housing, and the first antenna 531 and the second antenna 533 may be implemented as parts of the housing. If a state of the housing of the electronic device 500 changes (e.g., changes from an unfolded state to a folded state), a distance between the first antenna 531 and the second antenna 533 may become close, and isolation for ensuring the performance of the first antenna 531 and the second antenna 533 may be reduced, so that the performance of the performance of the first antenna 531 and the second antenna 533 may be degraded. The electronic device 500 may detect a change of the state of the form factor of the electronic device 500 via various sensors (e.g., a Hall sensor), and determine that a designated condition is satisfied.

The designated condition may include a condition of detecting that the external object contacts or approaches the electronic device 500. For example, the first antenna 531 and/or the second antenna 533 may be implemented via the housing of the electronic device 500. When an external object contacts or approaches a part of the housing of the electronic device 500, where the first antenna 531 is implemented, the performance of the first antenna 531 may be degraded due to the external object. The electronic device 500 may detect the contact or approach of the external object via various sensors (e.g., a proximity sensor), and determine that a designated condition is satisfied.

The designated condition described above may be a condition related to a physical event occurring on the electronic device 500. The designated condition may include various conditions that may affect the performance of the first antenna 531 and/or the second antenna 533.

The designated condition may include a condition in which a service being performed by the electronic device 500 is a service requiring a relatively high quality of service (QoS). A service requiring a high quality may require fast handover in order to ensure a high quality. The electronic device 500 may pre-designate a service (e.g., a voice call, a video call, and a mobile edge computing (MEC)) requiring a high quality from among services executable on the electronic device 500. Based on identification that the service being performed by the electronic device 500 is a designated service, the electronic device 500 may determine that the designated condition is satisfied.

The designated condition may include a condition in which the service being performed by the electronic device 500 is a service requiring a cellular communication connection to be maintained. A specific service (e.g., a voice call or a video call requiring real-time data transmission and/or reception) may be a service that cannot be performed when a cellular communication connection is disconnected. The electronic device 500 may pre-designate a service requiring a cellular communication connection to be maintained, from among services executable on the electronic device 500. Based on identification that the service being performed by the electronic device 500 is a designated service, the electronic device 500 may determine that the designated condition is satisfied.

The designated condition may include a condition in which the service being performed by the electronic device 500 is a service requiring fast handover. A specific service (e.g., a voice call or a video call requiring real-time data transmission and/or reception) is a service that cannot be performed when a cellular communication connection is disconnected, and fast handover may be required for maintaining the connection. The electronic device 500 may pre-designate a service requiring fast handover from among services executable on the electronic device 500. Based on identification that the service being performed by the electronic device 500 is a designated service, the electronic device 500 may determine that the designated condition is satisfied.

In operation 840, the electronic device 500 may identify, based on that the electronic device 500 satisfies the designated condition (operation 830—Y), whether the sum of the product of the first quality and the first weighting value and the product of the second quality and the second weighting value satisfies the report condition.

The electronic device 500 may perform calibration for at least one quality among the first quality and the second quality by multiplying each of the first quality and the second quality by a weighting factor. The communication processor 510 may identify whether a value obtained by multiplying the first quality by a first weighting factor and a value obtained by multiplying the second quality by a second weighting factor satisfy the report condition.

The electronic device 500 may configure, as the calibrated signal quality of the first node 410, the sum of the product of the first weighting factor and the signal quality of the first node 410 measured by the first antenna 531 and the product of the second weighting factor and the signal quality of the second node 420 measured by the second antenna 533. The electronic device 500 may configure, as the calibrated signal quality of the second node 420, the sum of the product of the first weighting factor and the signal quality of the second node 420 measured by the first antenna 531 and the product of the second weighting factor and the signal quality of the second node 420 measured by the second antenna 533.

The first weighting factor and the second weighting factor may be configured differently according to signal frequency bands. According to satisfaction of the designated condition, a weighting factor of a frequency band in which relatively greater imbalance occurs in performance of antennas may be configured to be larger than a weighting factor of a frequency band in which relatively less imbalance occurs in performance of antennas.

The first weighting factor and the second weighting factor may be configured differently depending on a signal quality of a signal received by the electronic device 500, and may also be configured differently depending on antennas.

The electronic device 500 may determine that the report condition is satisfied, based on identification that the calibrated signal quality (−73.5 dBm) of the second node 420 is equal to or greater than (or exceeds) the calibrated signal quality (−80 dBm) of the first node 410 by the designated value.

In operation 850, the electronic device 500 may identify, based on that the electronic device 500 does not satisfy the designated condition (operation 830—N), whether the better quality among the first quality and the second quality satisfies the report condition.

In operation 860, if the report condition is satisfied (operation 840-Y or operation 850—Y), the electronic device 500 may transmit a measurement report.

Based on determination that the report condition is satisfied, the electronic device 500 may transmit the measurement report including identification information of the second node 420 and the calibrated signal quality of the second node 420 to the cellular network 400 (or the first node 410 that is the connected node). The first node 410 having received the measurement report may determine whether to perform handover of the electronic device 500. Based on determination to perform handover of the electronic device 500, the first node 410 may transmit a handover request message of the electronic device 500 to a node (e.g., the second node 420) corresponding to identification information included in the measurement report. The second node 420 may perform a handover procedure with the electronic device 500 in response to reception of the handover request message.

Figure 9:
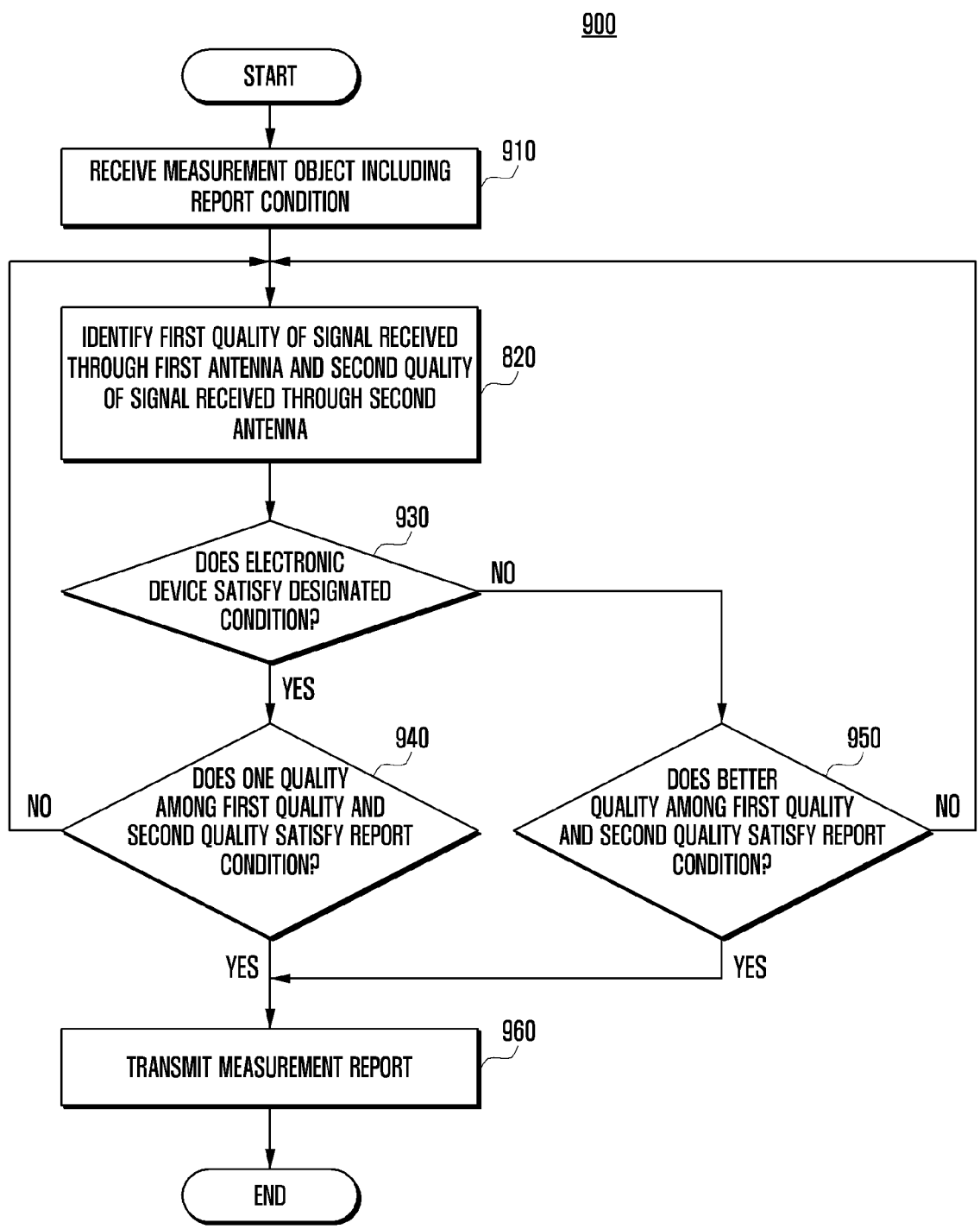
FIG. 9 is a diagram illustrating an embodiment in which an electronic device determines, based on whether a designated condition is satisfied, whether one quality among a first quality and a second quality satisfies a report condition, according to an example embodiment.

FIG. 9 is a diagram illustrating an embodiment 900 in which an electronic device determines, based on whether a designated condition is satisfied, whether one quality among a first quality and a second quality satisfies a report condition, according to an example embodiment.

Referring to FIG. 9, in operation 910, an electronic device (e.g., the electronic device 500 of FIG. 5) may receive a measurement object including a report condition from a cellular network (e.g., the cellular network 400 of FIG. 4).

The electronic device 500 may receive an RRC reconfiguration message while connecting to or when connected to a first node (e.g., the first node 410 of FIG. 4).

The RRC reconfiguration message may include information on a node (or a node adjacent to the first node 410) (e.g., the second node 420 and/or the third node 430) adjacent to the electronic device 500. Information on a node adjacent to the electronic device 500 may include information on a measurement object (measObject) and/or information on a report condition (report object), the information being related to the second node 420 and/or the third node 430 which are nodes adjacent to the electronic device 500 (or adjacent to the first node 410).

The measurement object is information required for the electronic device 500 to perform measurement, and may include frequency band information (e.g., channel information) for performing node search and quality measurement of a searched node, and/or identification information (e.g., a physical cell ID) of a node outputting a signal of a frequency band included in the frequency band information. The report condition is a condition for reporting a measured quality, and may include identification information of an event (e.g., event A3 that is a condition in which a signal strength of an adjacent node is greater than a signal strength of a connected node by a specific value or greater, and event A5 that is a condition in which a signal strength of a connected node is less than a designated magnitude, and a signal strength of an adjacent node is greater than the designated magnitude) related to a quality report, a designated value (threshold) related to a quality of a signal transmitted by the node, and/or a time (time to trigger (TTT)) during which satisfaction of the quality-related condition is maintained.

In operation 920, the electronic device 500 may identify a first quality of a signal received through a first antenna (e.g., the first antenna 531 of FIG. 5) and a second quality of a signal received through a second antenna (e.g., the second antenna 533 of FIG. 5).

When connected to the first node 410, the electronic device 500 may measure a quality of a signal transmitted by the first node 410 and/or a quality of a signal transmitted by a node (e.g., the second node 420 and/or the third node 430) adjacent to the electronic device 500, which is included in the measurement object.

The electronic device 500 may receive signals transmitted (or broadcast) by the first node 410 through the first antenna 531 and the second antenna 533, based on the identification information of the first node 410. The electronic device 500 may identify the first quality of the signal received through the first antenna 531 and the second quality of the signal received through the second antenna 533.

The electronic device 500 may identify, in operation 930, whether the electronic device 500 satisfies a designated condition.

The designated condition may include a condition in which a service being performed by the electronic device 500 is a service requiring a relatively high quality of service (QoS). A service requiring a high quality may require fast handover in order to ensure a high quality. The electronic device 500 may pre-designate a service (e.g., a voice call, a video call, and a mobile edge computing (MEC)) requiring a high quality from among services executable on the electronic device 500. Based on identification that the service being performed by the electronic device 500 is a designated service, the electronic device 500 may determine that the designated condition is satisfied.

The designated condition may include a condition in which the service being performed by the electronic device 500 is a service requiring a cellular communication connection to be maintained. A specific service (e.g., a voice call or a video call requiring real-time data transmission and/or reception) may be a service that cannot be performed when a cellular communication connection is disconnected. The electronic device 500 may pre-designate a service requiring a cellular communication connection to be maintained, from among services executable on the electronic device 500. Based on identification that the service being performed by the electronic device 500 is a designated service, the electronic device 500 may determine that the designated condition is satisfied.

The designated condition may include a condition in which the service being performed by the electronic device 500 is a service requiring fast handover. A specific service (e.g., a voice call or a video call requiring real-time data transmission and/or reception) is a service that cannot be performed when a cellular communication connection is disconnected, and fast handover may be required for maintaining the connection. The electronic device 500 may pre-designate a service requiring fast handover from among services executable on the electronic device 500. Based on identification that the service being performed by the electronic device 500 is a designated service, the electronic device 500 may determine that the designated condition is satisfied.

The designated condition may include a condition in which the electronic device 500 outputs a signal having a designated magnitude through the first antenna 531 and/or the second antenna 533, or a condition in which the electronic device 500 outputs a signal having a magnitude greater than the designated magnitude. The designated magnitude may be configured by various schemes, for example, the designated magnitude may be a high or maximum strength that the electronic device 500 is able to output. Based on identification that a strength of a signal output by the electronic device 500 is equal to the designated magnitude or is equal to or greater than the designated magnitude, the electronic device 500 may determine that the designated condition is satisfied.

The designated condition may include a condition in which a difference between the first quality of the signal received through the first antenna 531 and the second quality of the signal received through the second antenna 533 is equal to or greater than (or exceeds) a designated value.

In the electronic device 500, performance of at least one of the first antenna 531 and the second antenna 533 may change for various reasons. If the performance of at least one of the first antenna 531 and the second antenna 533 changes, imbalance between the performance of the first antenna 531 and the performance of the second antenna 533 may occur. Based on identification that a difference between the first quality of the signal received through the first antenna 531 and the second quality of the signal received through the second antenna 533 is equal to or greater than a designated value, the electronic device 500 may determine that the designated condition is satisfied.

In operation 940, the electronic device 500 may identify, based on that the electronic device 500 satisfies the designated condition (operation 930—Y), whether the better quality among the first quality and the second quality satisfies the report condition.

If even one quality among the first quality and the second quality satisfies the report condition, the electronic device 500 may transmit a measurement report including the quality satisfying the report condition to the cellular network 400, thereby inducing fast handover.

In operation 950, the electronic device 500 may identify, based on that the electronic device 500 does not satisfy the designated condition (operation 930—N), whether the better quality among the first quality and the second quality satisfies the report condition.

In operation 960, if the report condition is satisfied (e.g., operation 940—Yes and/or operation 950—Yes), the electronic device 500 may transmit the measurement report.

Based on determination that the report condition is satisfied, the electronic device 500 may transmit the measurement report including identification information of the second node 420 and the signal quality of the second node 420 to the cellular network 400 (or the first node 410 that is the connected node). The first node 410 having received the measurement report may determine whether to perform handover of the electronic device 500. Based on determination to perform handover of the electronic device 500, the first node 410 may transmit a handover request message of the electronic device 500 to a node (e.g., the second node 420) corresponding to identification information included in the measurement report. The second node 420 may perform a handover procedure with the electronic device 500 in response to reception of the handover request message.

Figure 10:
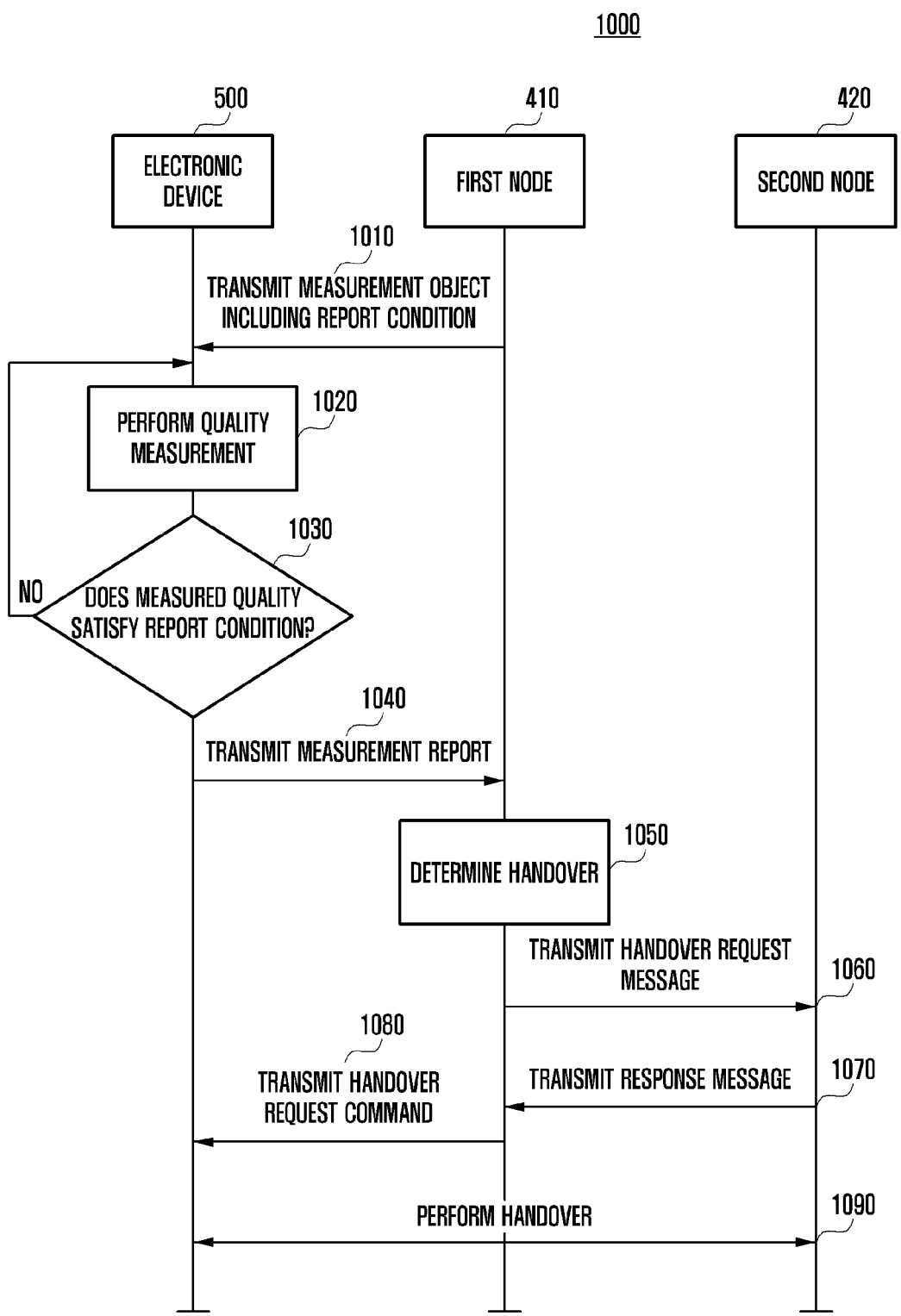
FIG. 10 is a diagram illustrating an embodiment in which an electronic device performs handover from a first node to a second node according to an example embodiment.

FIG. 10 is a diagram illustrating an embodiment in which an electronic device performs handover from a first node to a second node according to an example embodiment.

Referring to FIG. 10, in operation 1010 a first node (e.g., the first node 410 of FIG. 4) may transmit a measurement object including a report condition to an electronic device (e.g., the electronic device 500 of FIG. 5).

The electronic device 500 may receive an RRC reconfiguration message while connecting to or when connected to a first node (e.g., the first node 410 of FIG. 4).

The RRC reconfiguration message may include information on a node (or a node adjacent to the first node 410) (e.g., the second node 420 and/or the third node 430) adjacent to the electronic device 500. Information on a node adjacent to the electronic device 500 may include information on a measurement object (measObject) and/or information on a report condition (report object), the information being related to the second node 420 and/or the third node 430 which are nodes adjacent to the electronic device 500 (or adjacent to the first node 410).

The measurement object is information required for the electronic device 500 to perform measurement, and may include at least one of frequency band information (e.g., channel information) for performing node search and quality measurement of a searched node, and/or identification information (e.g., a physical cell ID) of a node outputting a signal of a frequency band included in the frequency band information. The report condition is a condition for reporting a measured quality, and may include identification information of an event (e.g., event A3 that is a condition in which a signal strength of an adjacent node is greater than a signal strength of a connected node by a specific value or greater, and event A5 that is a condition in which a signal strength of a connected node is less than a designated magnitude, and a signal strength of an adjacent node is greater than the designated magnitude) related to a quality report, a designated value (threshold) related to a quality of a signal transmitted by the node, and/or a time (time to trigger (TTT)) during which satisfaction of the quality-related condition is maintained.

In operation 1020, the electronic device 500 may perform quality measurement.

When connected to the first node 410, the electronic device 500 may measure a quality of a signal transmitted by the first node 410 and/or a quality of a signal transmitted by a node (e.g., the second node 420 and/or the third node 430) adjacent to the electronic device 500, which is included in the measurement object.

The electronic device 500 may receive signals transmitted (e.g., broadcast) by the first node 410 through the first antenna 531 and the second antenna 533, based on the identification information of the first node 410. The electronic device 500 may identify a first quality of the signal received through the first antenna and a second quality of the signal received through the second antenna.

The electronic device 500 may identify, in operation 1030, whether the measured quality satisfies a designated condition.

Based on identification that the electronic device 500 satisfies the designated condition, the electronic device 500 may identify whether the first quality of the signal received through the first antenna 531 satisfies the report condition.

Based on identification that the electronic device 500 satisfies the designated condition, the electronic device 500 may perform calibration on the first quality and/or the second quality, and identify whether the calibrated quality satisfies the report condition.

In operation 1040, based on that the measured quality satisfies the report condition (e.g., operation 1030—Yes), the electronic device 500 may transmit the measurement report including the measured quality (or calibrated quality) to the first node 410.

In operation 1050, the first node 410 may determine handover of the electronic device 500.

Handover of the electronic device 500 may include switching a connection of the electronic device 500 from the first node 410 to the second node 420.

In operation 1060, the first node 410 may transmit a handover request message to the second node 420.

In operation 1070, the second node 420 may transmit a response message corresponding to the handover request message to the first node 410.

In operation 1080, the first node 410 may transmit a handover command to the electronic device 500.

The handover command may be included in an RRC reconfiguration message so as to be transmitted.

In operation 1090, the electronic device 500 and the second node 420 may perform handover.

The electronic device 500 may perform a random-access (RA) procedure with the second node 420. The electronic device 500 may acquire synchronization with the second node 420 according to the execution of the RA procedure. After performing the RA procedure, the electronic device 500 may transmit an RRC reconfiguration completion message (e.g., a handover (HO) completion message) to the second node 420.

FIG. 11 is an operation flowchart 1100 illustrating an operation method of an electronic device according to an example embodiment.

Referring to FIG. 11, in operation 1110, an electronic device (e.g., the electronic device 500 of FIG. 5) may receive a measurement object from a cellular network (e.g., the cellular network 400 of FIG. 4).

The measurement object may be included in an RRC reconfiguration message, and the electronic device 500 may receive the measurement object from a first node (e.g., the first node 410 of FIG. 4) connected to the electronic device 500.

The electronic device 500 may receive an RRC reconfiguration message while connecting to or when connected to a first node (e.g., the first node 410 of FIG. 4).

The RRC reconfiguration message may include information on a node (or a node adjacent to the first node 410) (e.g., the second node 420 and/or the third node 430) adjacent to the electronic device 500. Information on a node adjacent to the electronic device 500 may include information on a measurement object (measObject) and/or information on a report condition (report object), the information being related to the second node 420 and/or the third node 430 which are nodes adjacent to the electronic device 500 (or adjacent to the first node 410).

The measurement object is information required for the electronic device 500 to perform measurement, and may include at least one of frequency band information (e.g., channel information) for performing node search and quality measurement of a searched node, and/or identification information (e.g., a physical cell ID) of a node outputting a signal of a frequency band included in the frequency band information. The report condition is a condition for reporting a measured quality, and may include identification information of an event (e.g., event A3 that is a condition in which a signal strength of an adjacent node is greater than a signal strength of a connected node by a specific value or greater, and event A5 that is a condition in which a signal strength of a connected node is less than a designated magnitude, and a signal strength of an adjacent node is greater than the designated magnitude) related to a quality report, a designated value (threshold) related to a quality of a signal transmitted by the node, and/or a time (time to trigger (TTT)) during which satisfaction of the quality-related condition is maintained.

In operation 1120, the electronic device 500 may identify a first quality of a signal received through a first antenna (e.g., the first antenna 531 of FIG. 5) and a second quality of a signal received through a second antenna (e.g., the second antenna 533 of FIG. 5).

When connected to the first node 410, the electronic device 500 may measure a quality of a signal transmitted by the first node 410 and/or a quality of a signal transmitted by a node (e.g., the second node 420 and/or the third node 430) adjacent to the electronic device 500, which is included in the measurement object.

The electronic device 500 may receive signals transmitted (or broadcast) by the first node 410 through the first antenna 531 and the second antenna 533, based on the identification information of the first node 410. The electronic device 500 may identify a first quality of the signal received through the first antenna and a second quality of the signal received through the second antenna.

In operation 1130, the electronic device 500 may identify, based on that the electronic device 500 satisfies the designated condition, whether the first quality satisfies the report condition.

The designated condition may include a condition in which a difference between the first quality of the signal received through the first antenna 531 and the second quality of the signal received through the second antenna 533 is equal to or greater than (or exceeds) a designated value.

The designated condition may include a condition related to occurrence (or increase) of imbalance between performance of the first antenna 531 and performance of the second antenna 533.

In the electronic device 500, performance of at least one of the first antenna 531 and the second antenna 533 may change for various reasons. If the performance of at least one of the first antenna 531 and the second antenna 533 changes, imbalance between the performance of the first antenna 531 and the performance of the second antenna 533 may occur.

The designated condition may include a condition in which the electronic device 500 is connected to an external electronic device via a port. For example, at least a part of the first antenna 531 may be implemented on the housing of the electronic device 500. When an external electronic device (e.g., a charger or an earphone) is connected via a port (e.g., a universal series bus (USB)) of the electronic device 500, the performance of the first antenna 533 may be degraded due to the external electronic device. The electronic device 500 may detect that the electronic device 500 is connected to the external electronic device via a port, and determine that the designated condition is satisfied.

The designated condition may include a condition that a state of a form factor of the housing of the electronic device 500 is changed. The housing of the electronic device 500 may be implemented as a foldable housing, and the first antenna 531 and the second antenna 533 may be implemented as parts of the housing. If a state of the housing of the electronic device 500 changes (e.g., changes from an unfolded state to a folded state), a distance between the first antenna 531 and the second antenna 533 may become close, and isolation for ensuring the performance of the first antenna 531 and the second antenna 533 may be reduced, so that the performance of the performance of the first antenna 531 and the second antenna 533 may be degraded. The electronic device 500 may detect a change of the state of the form factor of the electronic device 500 via various sensors (e.g., a Hall sensor), and determine that a designated condition is satisfied.

The designated condition may include a condition of detecting that the external object contacts or approaches the electronic device 500. For example, the first antenna 531 and/or the second antenna 533 may be implemented via the housing of the electronic device 500. When an external object contacts or approaches a part of the housing of the electronic device 500, where the first antenna 531 is implemented, the performance of the first antenna 531 may be degraded due to the external object. The electronic device 500 may detect the contact or approach of the external object via various sensors (e.g., a proximity sensor), and determine that a designated condition is satisfied.

The designated condition described above may be a condition related to a physical event occurring on the electronic device 500. The designated condition may include various conditions that may affect the performance of the first antenna 531 and/or the second antenna 533.

The designated condition may include a condition in which a service being performed by the electronic device 500 is a service requiring a relatively high quality of service (QoS). A service requiring a high quality may require fast handover in order to ensure a high quality. The electronic device 500 may pre-designate a service (e.g., a voice call, a video call, and a mobile edge computing (MEC)) requiring a high quality from among services executable on the electronic device 500. Based on identification that the service being performed by the electronic device 500 is a designated service, the electronic device 500 may determine that the designated condition is satisfied.

The designated condition may include a condition in which the service being performed by the electronic device 500 is a service requiring a cellular communication connection to be maintained. A specific service (e.g., a voice call or a video call requiring real-time data transmission and/or reception) may be a service that cannot be performed when a cellular communication connection is disconnected. The electronic device 500 may pre-designate a service requiring a cellular communication connection to be maintained, from among services executable on the electronic device 500. Based on identification that the service being performed by the electronic device 500 is a designated service, the electronic device 500 may determine that the designated condition is satisfied.

The designated condition may include a condition in which the service being performed by the electronic device 500 is a service requiring fast handover. A specific service (e.g., a voice call or a video call requiring real-time data transmission and/or reception) is a service that cannot be performed when a cellular communication connection is disconnected, and fast handover may be required for maintaining the connection. The electronic device 500 may pre-designate a service requiring fast handover from among services executable on the electronic device 500. Based on identification that the service being performed by the electronic device 500 is a designated service, the electronic device 500 may determine that the designated condition is satisfied.

The designated condition may include a condition in which the electronic device 500 outputs a signal having a designated magnitude through the first antenna 531 and/or the second antenna 533, or a condition in which the electronic device 500 outputs a signal having a magnitude greater than the designated magnitude. The designated magnitude may be configured by various schemes, for example, the designated magnitude may be a maximum strength that the electronic device 500 is able to output. Based on identification that a strength of a signal output by the electronic device 500 is equal to the designated magnitude or is equal to or greater than the designated magnitude, the electronic device 500 may determine that the designated condition is satisfied.

The designated condition may include a condition in which a difference between the first quality of the signal received through the first antenna 531 and the second quality of the signal received through the second antenna 533 is equal to or greater than (or exceeds) a designated value.

In the electronic device 500, performance of at least one of the first antenna 531 and the second antenna 533 may change for various reasons. If the performance of at least one of the first antenna 531 and the second antenna 533 changes, imbalance between the performance of the first antenna 531 and the performance of the second antenna 533 may occur. Based on identification that a difference between the first quality of the signal received through the first antenna 531 and the second quality of the signal received through the second antenna 533 is equal to or greater than a designated value, the electronic device 500 may determine that the designated condition is satisfied.

Based on identification that the electronic device 500 satisfies the designated condition, the electronic device 500 may use a quality of a signal, which is received by an antenna capable of signal transmission or reception, for determination of whether the report condition is satisfied. The antenna capable of signal transmission or reception may be an antenna that is more important to a communication quality compared to an antenna performing diversity reception. Therefore, when the designated condition is satisfied, the electronic device 500 according to an example embodiment may determine whether the report condition is satisfied, by using the relatively more important antenna capable of signal transmission or reception.

Based on identification that the electronic device 500 satisfies the designated condition, the electronic device 500 may identify whether the first quality of the signal received by the first antenna 531 satisfies the report condition.

In operation 1140, based on that the first quality satisfies the report condition, the electronic device 500 may transmit a measurement report including the first quality to the cellular network 400.

Based on determination that the report condition is satisfied, the electronic device 500 may transmit the measurement report including identification information of the second node 420 and the signal quality of the second node 420 measured by the first antenna 531 to the cellular network 400 (or the first node 410 that is the connected node). The first node 410 having received the measurement report may determine whether to perform handover of the electronic device 500. Based on determination to perform handover of the electronic device 500, the first node 410 (e.g. a cell and/or base station) may transmit a handover request message of the electronic device 500 to a node (e.g., the second node 420, such as a cell and/or base station) corresponding to identification information included in the measurement report. The second node 420 may perform a handover procedure with the electronic device 500 in response to reception of the handover request message.

An electronic device may include: a first antenna configured to transmit a signal or receive a signal; a second antenna configured to receive the signal; a communication circuit connected to the first antenna and the second antenna, and configured to receive data from or transmit data to a network via a first node; and a communication processor, wherein the communication processor receives a measurement object including information related to a second node adjacent to the first node from the network. The communication processor may identify a first quality of the signal received through the first antenna and a second quality of the signal received through the second antenna. The communication processor may identify whether the first quality satisfies a report condition included in the measurement object, based on that the electronic device satisfies a designated condition. The communication processor may be configured to transmit a measurement report including the first quality to the network, based on that the first quality satisfies the report condition.

In the electronic device, the communication processor may identify, based on that the electronic device does not satisfy the designated condition, whether the better quality among the first quality and the second quality satisfies the report condition included in the measurement object. The communication processor may be configured to transmit the measurement report including the better quality to the network, based on that the better quality satisfies the report condition.

In the electronic device, the designated condition may include occurrence of an event in which a difference in performance between the first antenna and the second antenna increases.

In the electronic device, the designated condition may include a condition in which the first quality and the second quality are different by a designated value or greater.

In the electronic device, the designated condition may include a condition of detecting the electronic device being connected to an external electronic device via a port.

In the electronic device, the designated condition may include a condition of detecting a change in a state of a form factor of the electronic device.

In the electronic device, the designated condition may include a condition in which a contact or approach of an external object with or to the electronic device is detected by a proximity sensor of the electronic device.

In the electronic device, the designated condition may include a condition in which a service that the electronic device performs is a service requiring fast handover.

An operation method of an electronic device may include receiving a measurement object including information related to a second node adjacent to a first node connected to the electronic device from a network. The operation method of the electronic device may include identifying a first quality of a signal received through a first antenna and a second quality of a signal received through a second antenna. The operation method of the electronic device may include identifying whether the first quality satisfies a report condition included in the measurement object, based on that the electronic device satisfies a designated condition. The operation method of the electronic device may include transmitting a measurement report including the first quality to the network, based on that the first quality satisfies the report condition.

The operation method of the electronic device may include identifying, based on that the electronic device does not satisfy the designated condition, whether the better quality among the first quality and the second quality satisfies the report condition. The operation method of the electronic device may include transmitting the measurement report including the better quality to the network, based on that the better quality satisfies the report condition.

In the operation method of the electronic device, the designated condition may include an event in which a difference in performance between the first antenna and the second antenna increases.

In the operation method of the electronic device, the designated condition may include a condition in which the first quality and the second quality are different by a designated value or greater.

In the operation method of the electronic device, the designated condition may include a condition of detecting the electronic device being connected to an external electronic device via a port.

In the operation method of the electronic device, the designated condition may include a condition of detecting a change in a state of a form factor of the electronic device.

In the operation method of the electronic device, the designated condition may include a condition in which a contact or approach of an external object with or to the electronic device is detected by a proximity sensor of the electronic device.

In the operation method of the electronic device, the designated condition may include a condition in which a service that the electronic device performs is a service requiring fast handover.

Each embodiment herein may be used in combination with any other embodiment(s) described herein.

An electronic device may include: a first antenna configured to transmit a signal or receive a signal; a second antenna configured to receive a signal; a communication circuit connected to the first antenna and the second antenna, and configured to receive data from or transmit data to a network via a first node; and a communication processor. The communication processor may receive a measurement object including information related to a second node adjacent to the first node from the network. The communication processor may identify a first quality of the signal received through the first antenna and a second quality of the signal received through the second antenna. The communication processor may calibrate at least one quality among the first quality and the second quality, based on that the electronic device satisfies a designated condition. The communication processor may identify whether the calibrated quality satisfies a report condition included in the measurement object. The communication processor may be configured to transmit a measurement report including the calibrated quality to the network, based on that the calibrated quality satisfies the report condition.

In the electronic device, the communication processor may add a designated value (offset) to at least one quality among the first quality and the second quality, based on that the electronic device satisfies the designated condition. The communication processor may identify whether the better quality among the quality to which the designated value has been added and the other quality satisfies the report condition included in the measurement object. The communication processor may be configured to, based on that the better quality satisfies the report condition, transmit the measurement report including the calibrated quality to the network.

In the electronic device, the designated value may be configured differently depending on a frequency band of the signal and a quality of the signal.

In the electronic device, the communication processor may identify, based on that the electronic device satisfies a designated condition, whether the sum of a value obtained by applying a first weighting factor to the first quality and a value obtained by applying a second weighting factor to the second quality satisfies the report condition included in the measurement object. The communication processor may be configured to transmit the measurement report including the calibrated quality to the network, based on that the value satisfies the report condition.

In the electronic device, the first weighting factor and the second weighting factor may be configured differently depending on a frequency band of the signal and a quality of the signal.

In the electronic device, the designated condition may include an event in which a difference in performance between the first antenna and the second antenna increases.

In the electronic device, the designated condition may include a condition in which the first quality and the second quality are different by a designated value or greater.

In the electronic device, the designated condition may include a condition of detecting the electronic device being connected to an external electronic device via a port.

In the electronic device, the designated condition may include a condition of detecting a change in a state of a form factor of the electronic device.

In the electronic device, the designated condition may include a condition in which a contact or approach of an external object with or to the electronic device is detected by a proximity sensor of the electronic device.

In the electronic device, the designated condition may include a condition in which a service that the electronic device performs is a service requiring fast handover.

An electronic device may include: a first antenna configured to transmit a signal or receive a signal; a second antenna configured to receive a signal; a communication circuit connected, directly or indirectly, to the first antenna and the second antenna, and configured to receive data from or transmit data to a network via a first node; and a communication processor. The communication processor may receive a measurement object including information related to a second node adjacent to the first node from the network. The communication processor may identify a first quality of the signal received through the first antenna and a second quality of the signal received through the second antenna. The communication processor may identify whether one quality among the first quality and the second quality satisfies a report condition included in the measurement object, based on that the electronic device satisfies a designated condition. The communication processor may be configured to transmit a measurement report including the calibrated quality to the network, based on that the one quality satisfies the report condition. "Based on" as used herein covers based at least on.

In the electronic device, the designated condition may include a condition in which a service that the electronic device performs is a service requiring fast handover.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a first antenna configured to transmit a signal or receive a signal;
a second antenna configured to receive the signal;
a communication circuit connected to the first antenna and to the second antenna, and configured to receive data from and/or transmit data to a network via a first node; and
a communication processor,
wherein the communication processor is configured to:
receive a measurement object comprising information related to a second node adjacent to the first node from the network;
identify a first quality of the signal received through the first antenna and a second quality of the signal received through the second antenna;
based on that the electronic device satisfies a designated condition, identify whether the first quality satisfies a report condition included in the measurement object; and
based on that the first quality satisfies the report condition, transmit a measurement report comprising the first quality to the network.

2. The electronic device of claim 1, wherein the communication processor is configured to:
based on that the electronic device does not satisfy the designated condition, identify whether a better quality among the first quality and the second quality satisfies the report condition; and
based on that the better quality satisfies the report condition, transmit the measurement report comprising the better quality to the network.

3. The electronic device of claim 1, wherein the designated condition comprises occurrence of an event in which a difference in performance between the first antenna and the second antenna increases.

4. The electronic device of claim 1, wherein the designated condition comprises a condition in which the first quality and the second quality are different by a designated value or greater.

5. The electronic device of claim 1, wherein the designated condition comprises a condition of detecting the electronic device being connected to an external electronic device via a port.

6. The electronic device of claim 1, wherein the designated condition comprises a condition of detecting a change in a state of a form factor of the electronic device.

7. The electronic device of claim 1, wherein the designated condition comprises a condition in which a contact and/or approach of an external object with and/or to the electronic device is detected by a proximity sensor of the electronic device.

8. The electronic device of claim 1, wherein the designated condition comprises a condition in which a service that the electronic device performs is a service requiring fast handover.

9. An operation method of an electronic device, the method comprising:
receiving a measurement object comprising information related to a second node proximate to a first node connected to the electronic device from a network;
identifying a first quality of a signal received through a first antenna and a second quality of a signal received through a second antenna;
based on the electronic device satisfying a designated condition, identifying whether the first quality satisfies a report condition included in the measurement object; and
based on the first quality satisfying the report condition, transmitting a measurement report comprising the first quality to the network.

10. The method of claim 9, further comprising:
based on the electronic device not satisfying the designated condition, identifying whether a better quality among the first quality and the second quality satisfies the report condition; and
based on the better quality satisfying the report condition, transmitting the measurement report comprising the better quality to the network.

11. The method of claim 9, wherein the designated condition comprises an event in which a difference in performance between the first antenna and the second antenna increases.

12. The method of claim 9, wherein the designated condition comprises a condition in which the first quality and the second quality are different by a designated value or greater.

13. The method of claim 9, wherein the designated condition comprises a condition of detecting the electronic device being connected to an external electronic device via a port.

14. The method of claim 9, wherein the designated condition comprises a condition of detecting a change in a state of a form factor of the electronic device.

15. The method of claim 9, wherein the designated condition comprises a condition in which a contact and/or approach of an external object with and/or to the electronic device is detected by a proximity sensor of the electronic device.

16. The method of claim 9, wherein the designated condition comprises a condition in which a service that the electronic device performs is a service requiring fast handover.

17. An electronic device comprising:
a first antenna;
a second antenna;
a communication circuit connected to the first antenna and to the second antenna, and configured to receive data from and/or transmit data to a network via a first node; and
a communication processor comprising processing circuitry,
wherein the communication processor is configured to:
receive a measurement object comprising information related to a second node adjacent to the first node from the network;
identify a first quality of a signal received through the first antenna and a second quality of signal received through the second antenna;
based on that the electronic device satisfies a designated condition, calibrate at least one quality among the first quality and the second quality;
identify whether the calibrated quality satisfies a report condition included in the measurement object; and
based on that the calibrated quality satisfies the report condition, transmit a measurement report comprising the calibrated quality to the network.

18. The electronic device of claim 17, wherein the communication processor is configured to:
- based on that the electronic device satisfies the designated condition, add a designated value (offset) to at least one quality among the first quality and the second quality;
- identify whether a better quality among the quality to which the designated value has been added and the other quality satisfies the report condition included in the measurement object; and
- based on that the better quality satisfies the report condition, transmit the measurement report comprising the calibrated quality to the network.

19. The electronic device of claim 18, wherein the designated value is configured differently depending on a frequency band of the signal and a quality of the signal.

20. The electronic device of claim 17, wherein the communication processor is configured to:
- based on that the electronic device satisfies a designated condition, identify whether a sum of a value obtained at least by applying a first weighting factor to the first quality and a value obtained at least by applying a second weighting factor to the second quality satisfies the report condition included in the measurement object; and
- based on that the value satisfies the report condition, transmit the measurement report comprising the calibrated quality to the network.

* * * * *